(12) United States Patent
Geskes et al.

(10) Patent No.: US 8,544,454 B2
(45) Date of Patent: Oct. 1, 2013

(54) HEAT EXCHANGER FOR A MOTOR VEHICLE

(75) Inventors: Peter Geskes, Ostfildern (DE); Bernd Grünenwald, Nürtingen (DE); Wolfgang Knödler, Waiblingen (DE); Jens Ruckwied, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1075 days.

(21) Appl. No.: 12/282,988

(22) PCT Filed: Mar. 16, 2007

(86) PCT No.: PCT/EP2007/002360
§ 371 (c)(1),
(2), (4) Date: Sep. 15, 2008

(87) PCT Pub. No.: WO2007/104580
PCT Pub. Date: Sep. 20, 2007

(65) Prior Publication Data
US 2009/0090486 A1    Apr. 9, 2009

(30) Foreign Application Priority Data

Mar. 16, 2006 (DE) .................. 10 2006 012 480
Mar. 30, 2006 (DE) .................. 10 2006 015 224

(51) Int. Cl.
*F02B 47/08* (2006.01)
*B60H 1/00* (2006.01)
*B60H 3/00* (2006.01)

(52) U.S. Cl.
USPC ............... 123/568.12; 123/568.11; 165/44; 165/51; 165/52; 165/53; 165/54; 165/55; 165/56; 165/65; 165/66

(58) Field of Classification Search
USPC .......... 165/44, 51, 52, 53, 54, 55, 56, 65, 165/66; 123/568.11, 568.12
See application file for complete search history.

(56) References Cited

U.S. PATENT DOCUMENTS 1,907,033 A * 5/1933 Askin .................. 165/163
2,388,721 A * 11/1945 Clancy ................ 165/159
(Continued)

FOREIGN PATENT DOCUMENTS

CN    1369680 A    9/2002
DE       3175       5/1878
(Continued)

OTHER PUBLICATIONS

Payne et al., Void Fraction and Pressure Drop in Microchannels, Dec. 2000, University of Illinois, All.*
(Continued)

*Primary Examiner* — Stephen K Cronin
*Assistant Examiner* — Raza Najmuddin
(74) *Attorney, Agent, or Firm* — Foley & Lardner LLP

(57) ABSTRACT

The invention relates to a heat exchanger (or a motor vehicle, comprising a first flow path (1) with a number of flow conduits (6) for conducting a fluid to be cooled, a deflection region (13), situated downstream of the first flow path (1) and a second flow path (2), situated downstream ol the deflection region (13). According to the invention, the flow conduits (6) of the first flow path (1) continue in the deflection region (13) and the second (low path (2) as continuous separate flow conduits (6). The invention also relates to a flow conduit (41, 41', 61, 61', 71, 71', 81, 81', 91, 91') for a heat exchanger (30,40) for exchanging heat between a first fluid (31) and a second fluid (33). The aim of the invention is to guarantee an improved transfer of heat with a simultaneous acceptable pressure drop, whilst reducing the blocking risk.

42 Claims, 19 Drawing Sheets

(56) References Cited

U.S. PATENT DOCUMENTS

| | | | |
|---|---|---|---|
| 2,462,136 A * | 2/1949 | Smith | 165/148 |
| 2,873,098 A | 2/1959 | Morgan | |
| 3,486,489 A | 12/1969 | Huggins | |
| 3,552,765 A * | 1/1971 | Ostwald | 280/782 |
| 4,208,996 A * | 6/1980 | Lancaster | 123/557 |
| 4,368,778 A | 1/1983 | Nishimura et al. | |
| 4,632,178 A * | 12/1986 | Hirano | 165/299 |
| 4,685,292 A * | 8/1987 | Brigham et al. | 60/320 |
| 4,735,260 A | 4/1988 | Wöhrl et al. | |
| 4,794,985 A * | 1/1989 | Paulman et al. | 165/150 |
| 5,184,672 A | 2/1993 | Aoki | |
| 5,314,013 A | 5/1994 | Tanabe | |
| 5,848,636 A | 12/1998 | Chuang | |
| 6,880,627 B2 | 4/2005 | Sanada et al. | |
| 6,964,296 B2 * | 11/2005 | Memory et al. | 165/151 |
| 7,032,313 B2 | 4/2006 | Memory et al. | |
| 2002/0134537 A1 | 9/2002 | Memory et al. | |
| 2004/0069477 A1 * | 4/2004 | Nishikawa et al. | 165/175 |
| 2004/0149424 A1 | 8/2004 | Memory et al. | |
| 2005/0061488 A1 | 3/2005 | Yu et al. | |
| 2007/0017661 A1 * | 1/2007 | Geskes et al. | 165/166 |
| 2008/0047685 A1 * | 2/2008 | Kim | 165/52 |

FOREIGN PATENT DOCUMENTS

| | | | | |
|---|---|---|---|---|
| DE | 26 57 666 A1 | 12/1977 | | |
| DE | 30 39 745 A1 | 8/1981 | | |
| DE | 81 09 730 U1 | 11/1981 | | |
| DE | 31 36 865 A1 | 3/1983 | | |
| DE | 3505492 A1 * | 8/1986 | | |
| DE | 36 15 300 C2 | 11/1987 | | |
| DE | 37 31 669 A1 | 4/1989 | | |
| DE | 39 36 918 C2 | 11/1990 | | |
| DE | 94 06 559 U1 | 7/1994 | | |
| DE | 100 60 104 A1 | 6/2001 | | |
| DE | 298 24 612 U1 | 10/2001 | | |
| DE | 202 05 200 U1 | 8/2002 | | |
| DE | 102 25 812 C1 | 8/2003 | | |
| DE | 10225812 C1 * | 8/2003 | | |
| DE | 1355058 A2 * | 10/2003 | | |
| EP | 1 231 448 A2 | 8/2002 | | |
| EP | 1 306 639 A2 | 5/2003 | | |
| EP | 1 342 970 A1 | 9/2003 | | |
| EP | 1 355 058 A2 | 10/2003 | | |
| FR | 2 579 311 A1 | 9/1986 | | |
| JP | 356119497 A * | 9/1981 | | 165/133 |
| JP | 58-55684 A | 4/1983 | | |
| JP | 60-73294 A | 4/1985 | | |
| JP | 61223490 A | 10/1986 | | |
| JP | 61243281 A | 10/1986 | | |
| JP | 63-189791 A | 8/1988 | | |
| JP | 4115282 U | 10/1992 | | |
| JP | 2002318087 A | 10/2002 | | |
| SU | 642590 | 1/1979 | | |
| WO | WO 2005/040708 A1 | 5/2005 | | |

OTHER PUBLICATIONS

Lee et al., Pressure drop correlations for two-phase flow withhin horizontal rectangular channels with small heights, International Journal of Multiphase Flow, All.*

Lange et al., Cooler for an exhaust gas, withdrawn from the principal flow of an internal combustion engine, Oct. 2003, EP 1355058A2, Human Translation.*

Office Action mailed Aug. 9, 2011 in related Japanese Application No. 2008-558732 (6 pgs.).

Examination Report mailed Apr. 16, 2013 in related European application No. 07 723 338.5 (5 pgs.).

* cited by examiner

Figure 1:
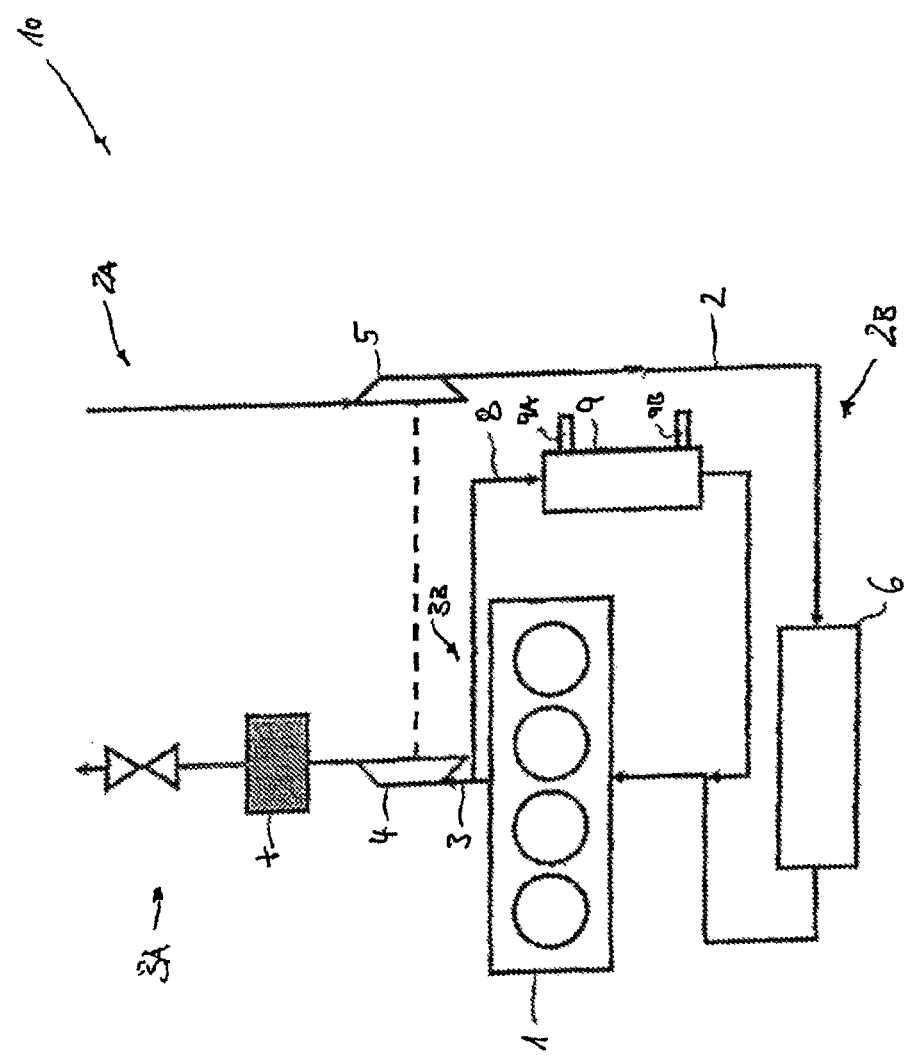

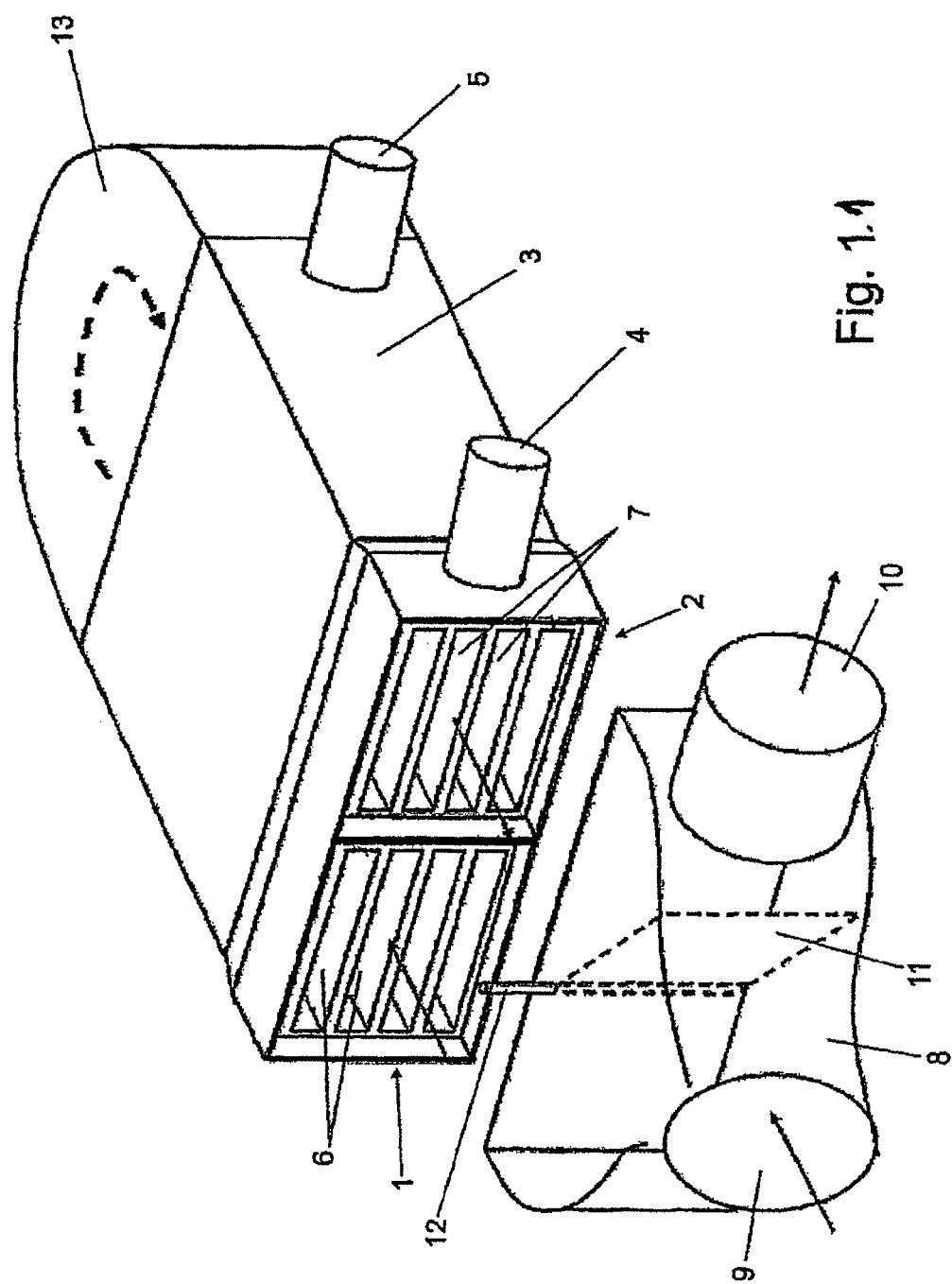
Fig. 1.1

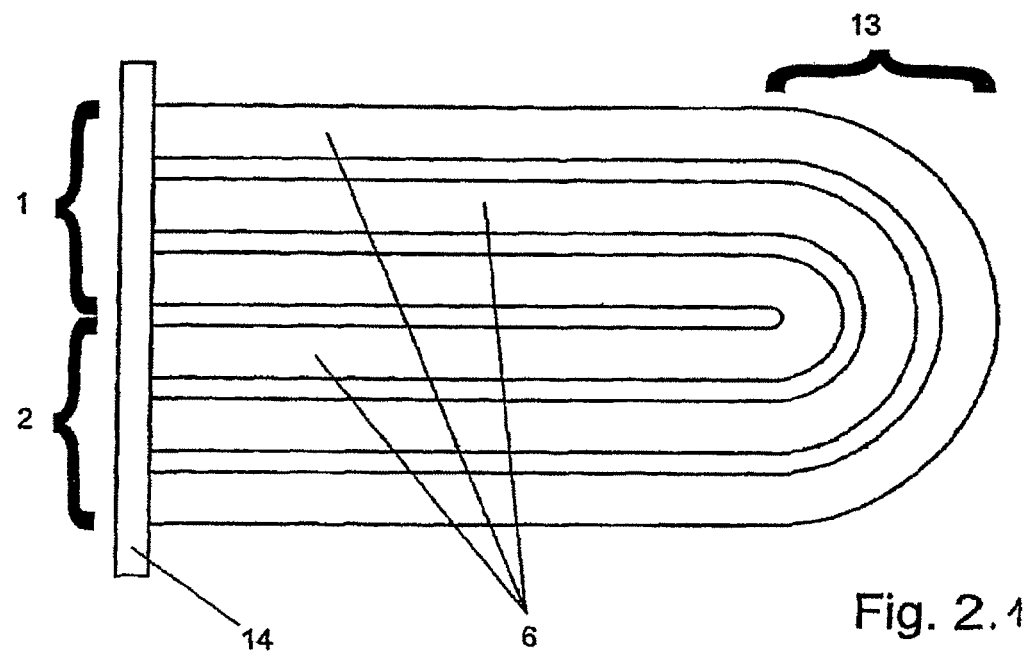
Fig. 2.1
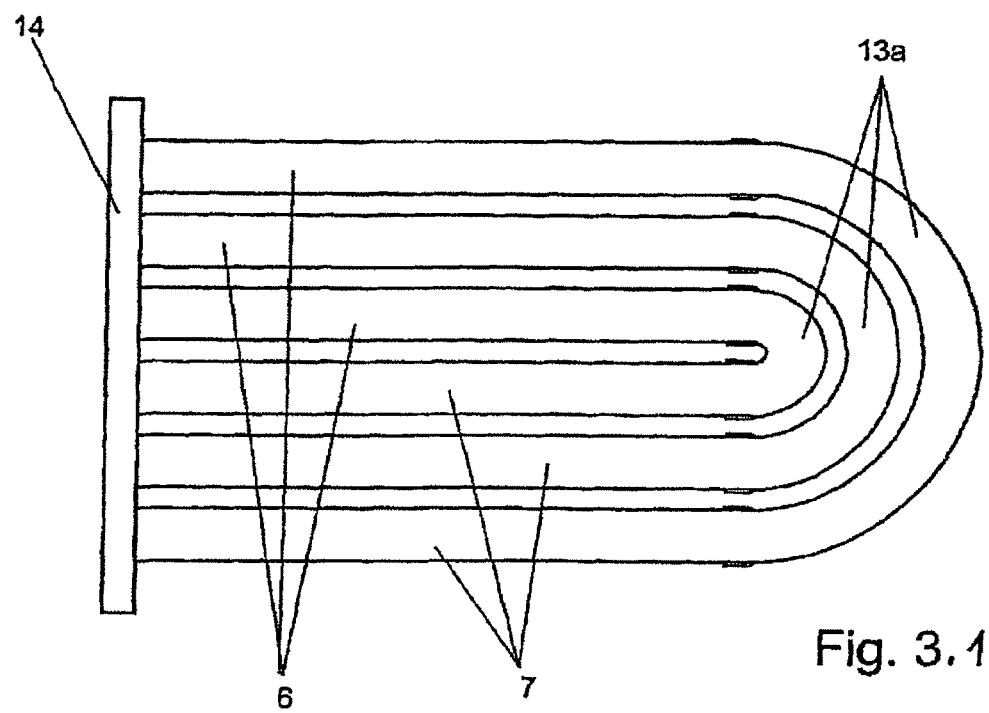
Fig. 3.1

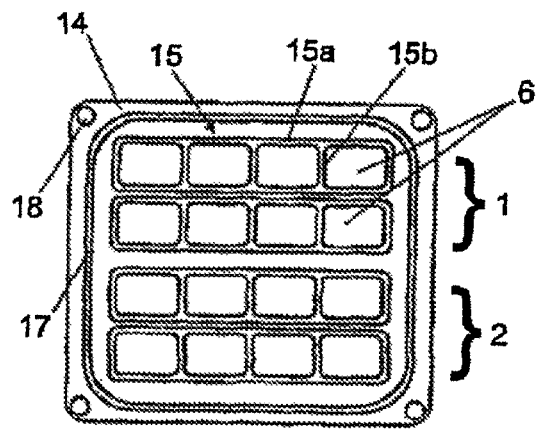
Fig. 4.1
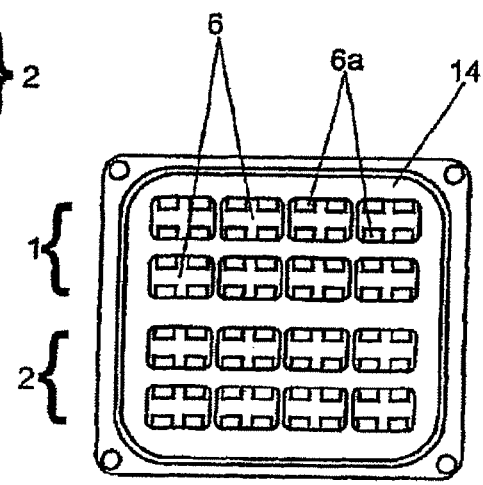
Fig. 5.1
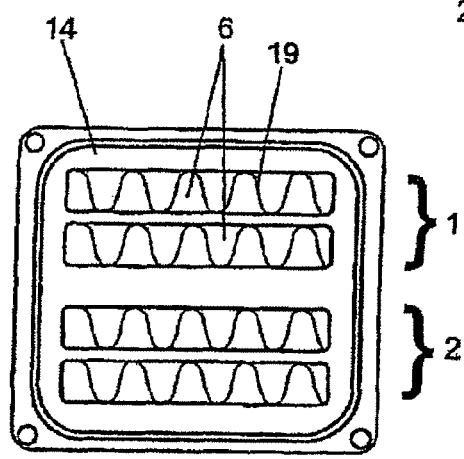
Fig. 6.1
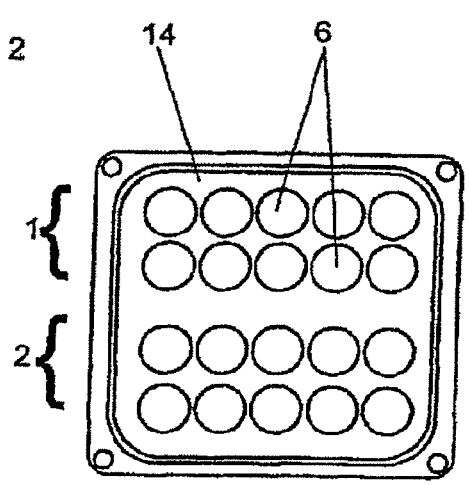
Fig. 7.1

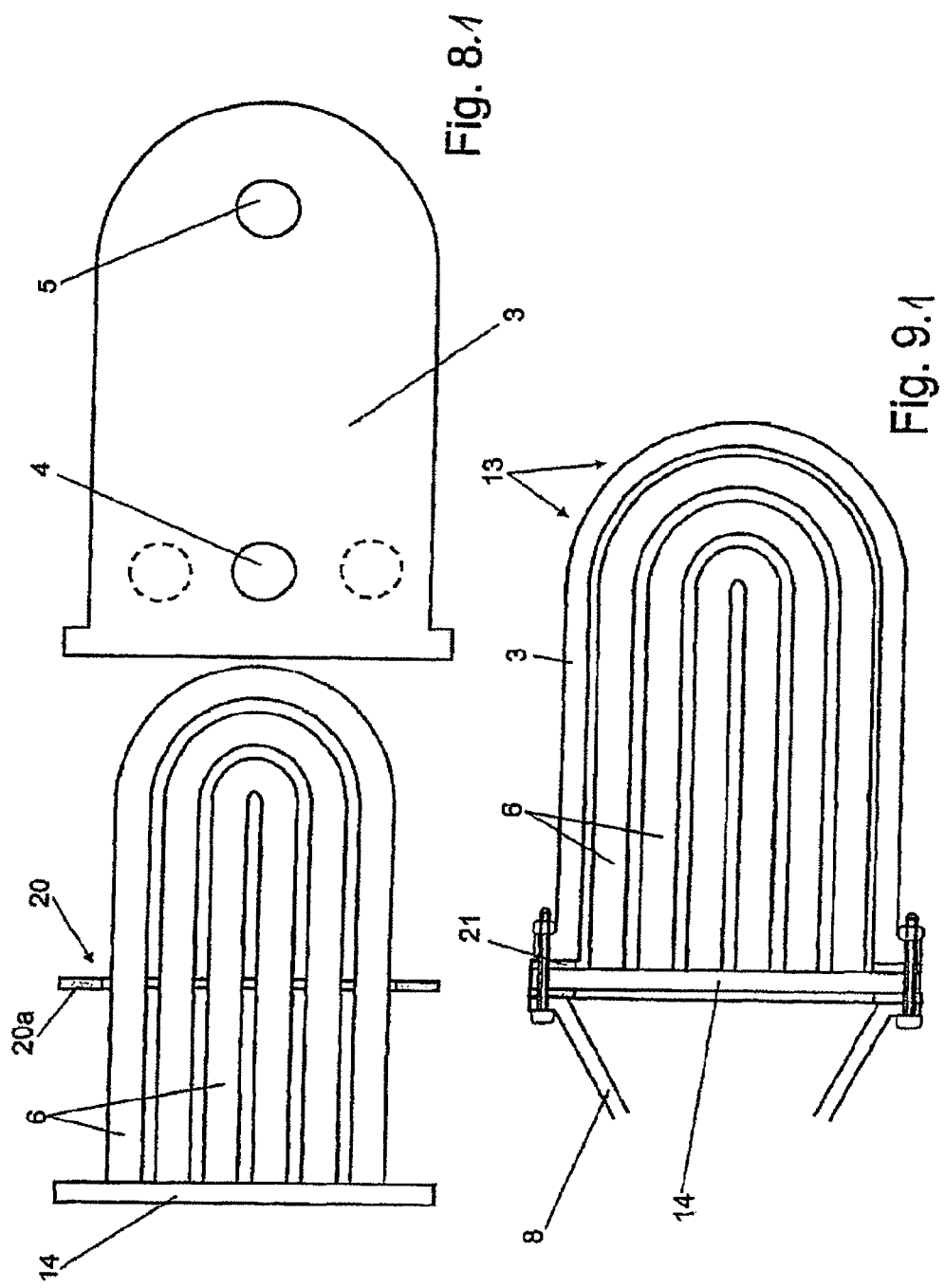

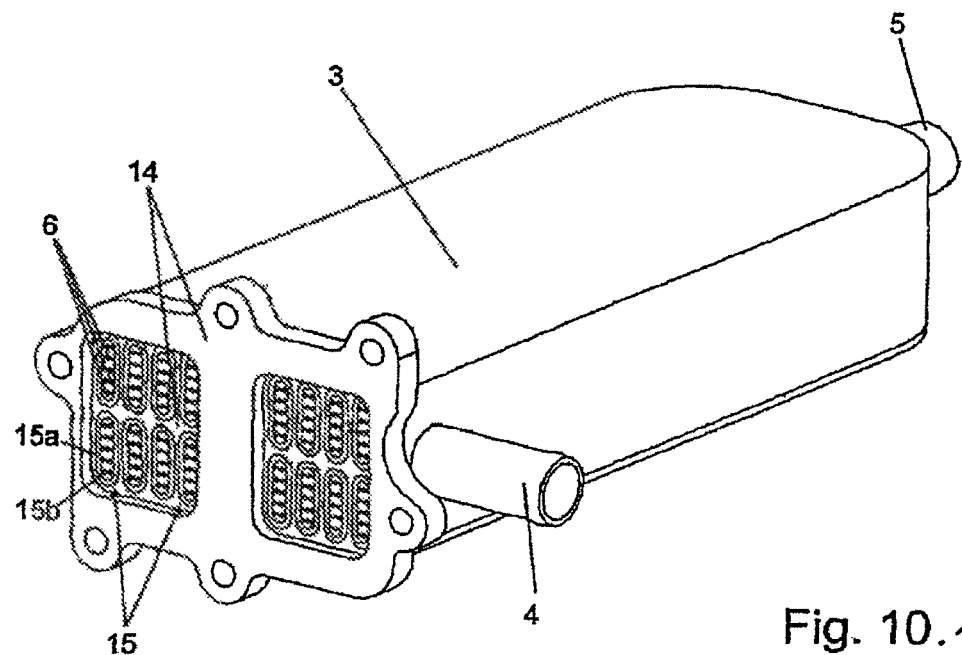
Fig. 10.1
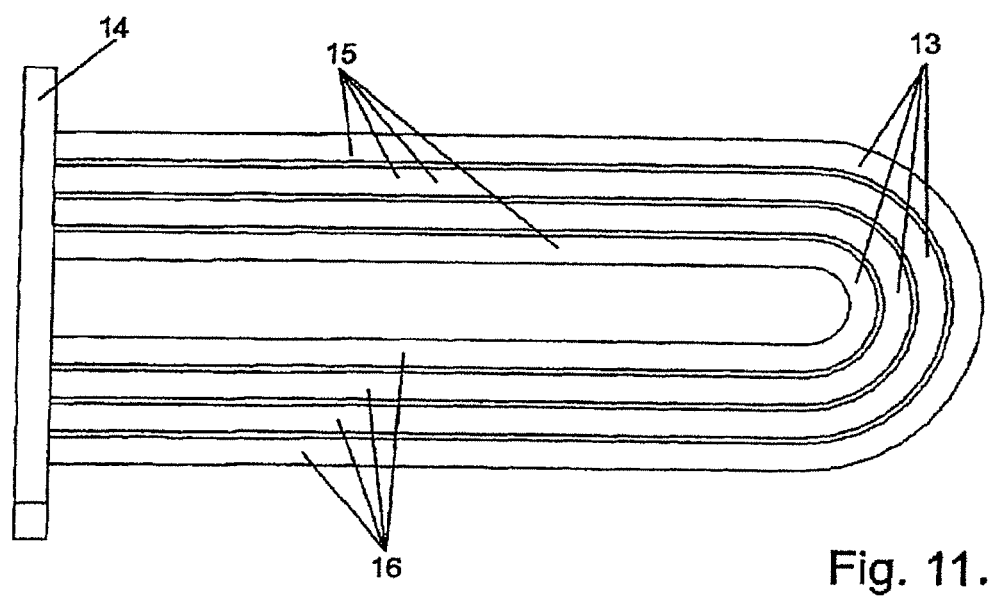
Fig. 11.1

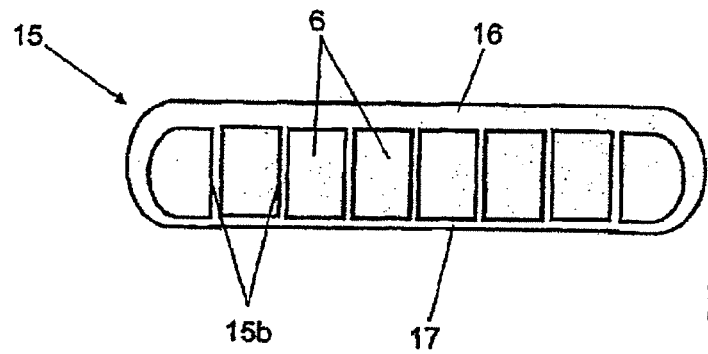
Fig. 12.1
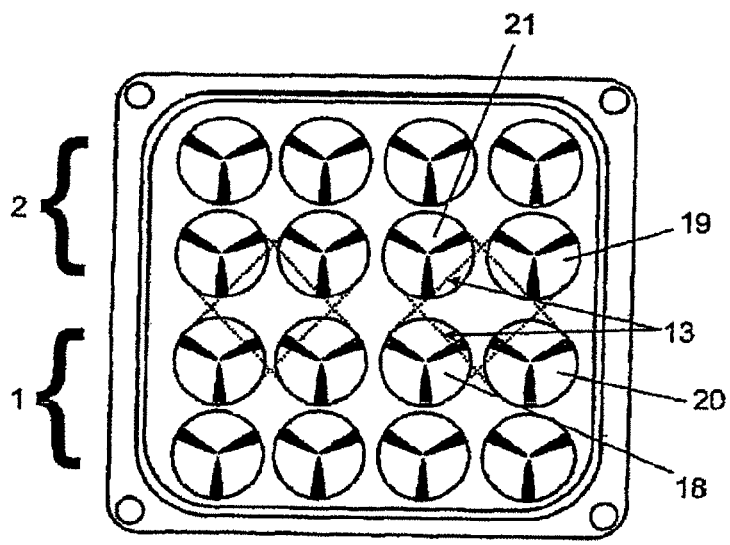
Fig. 13.1
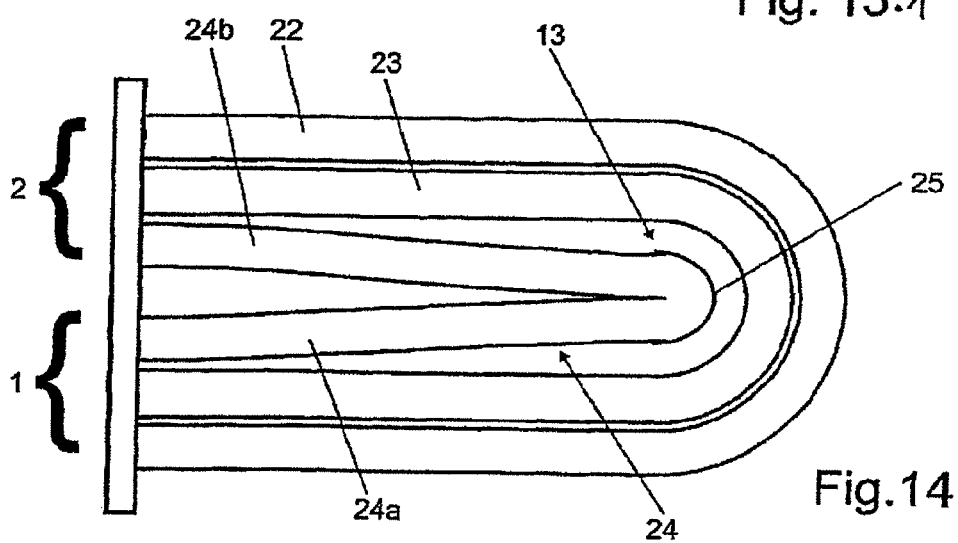
Fig. 14.1

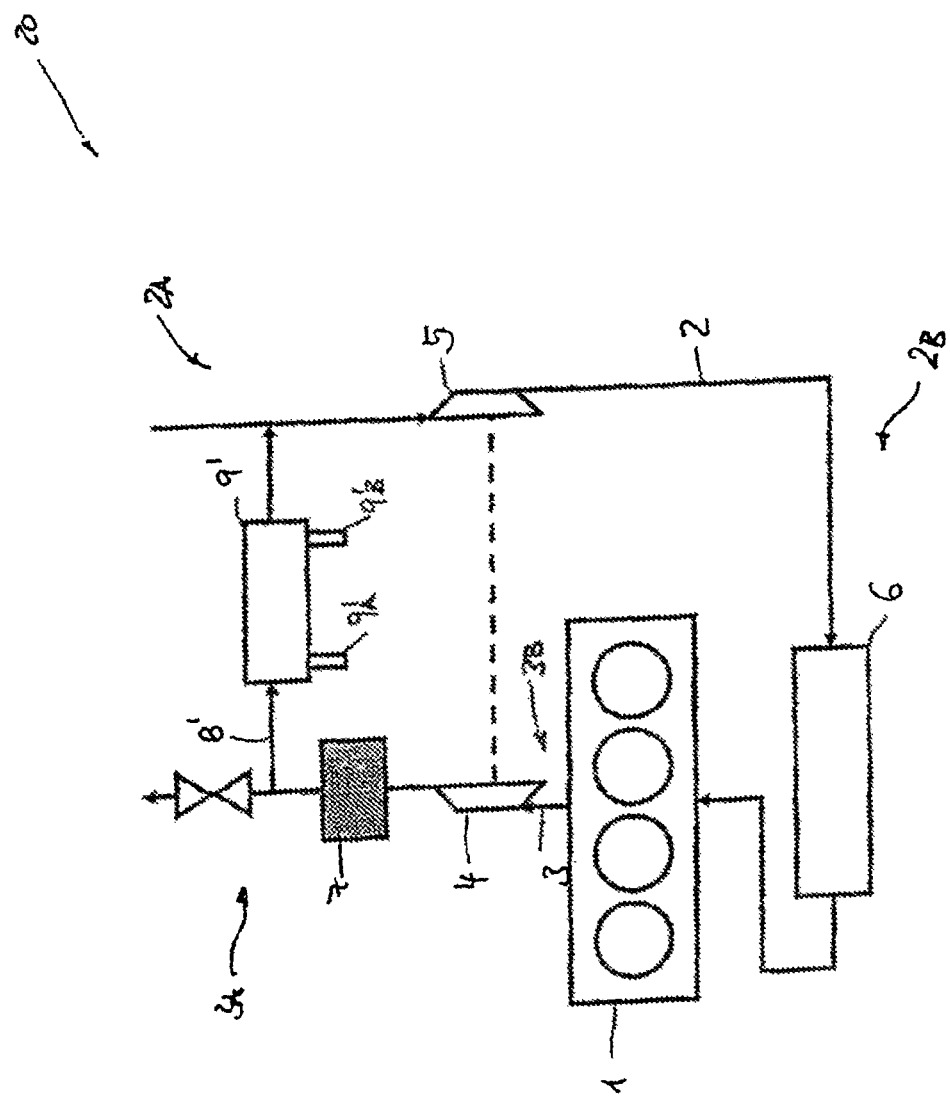

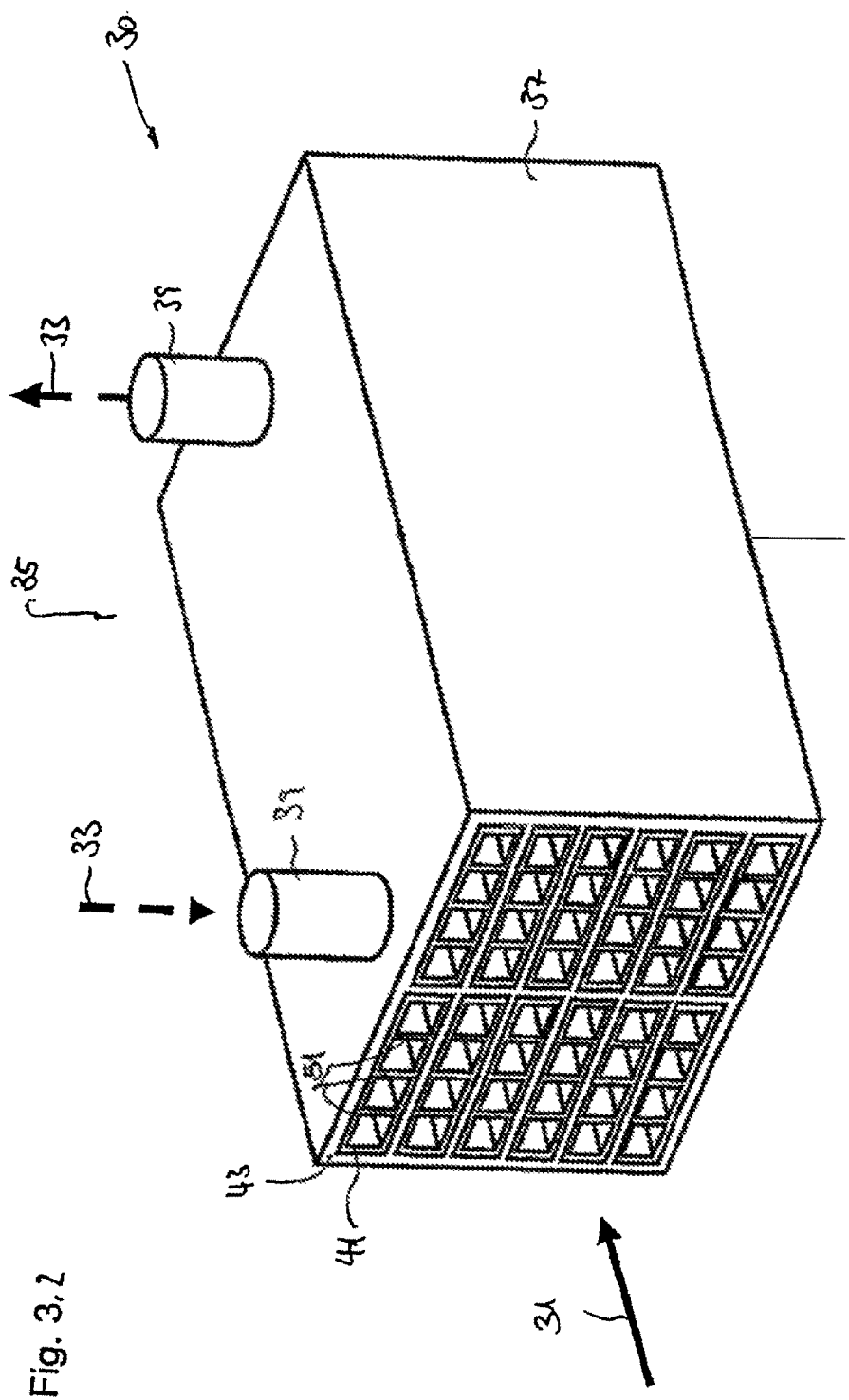
Fig. 3.2

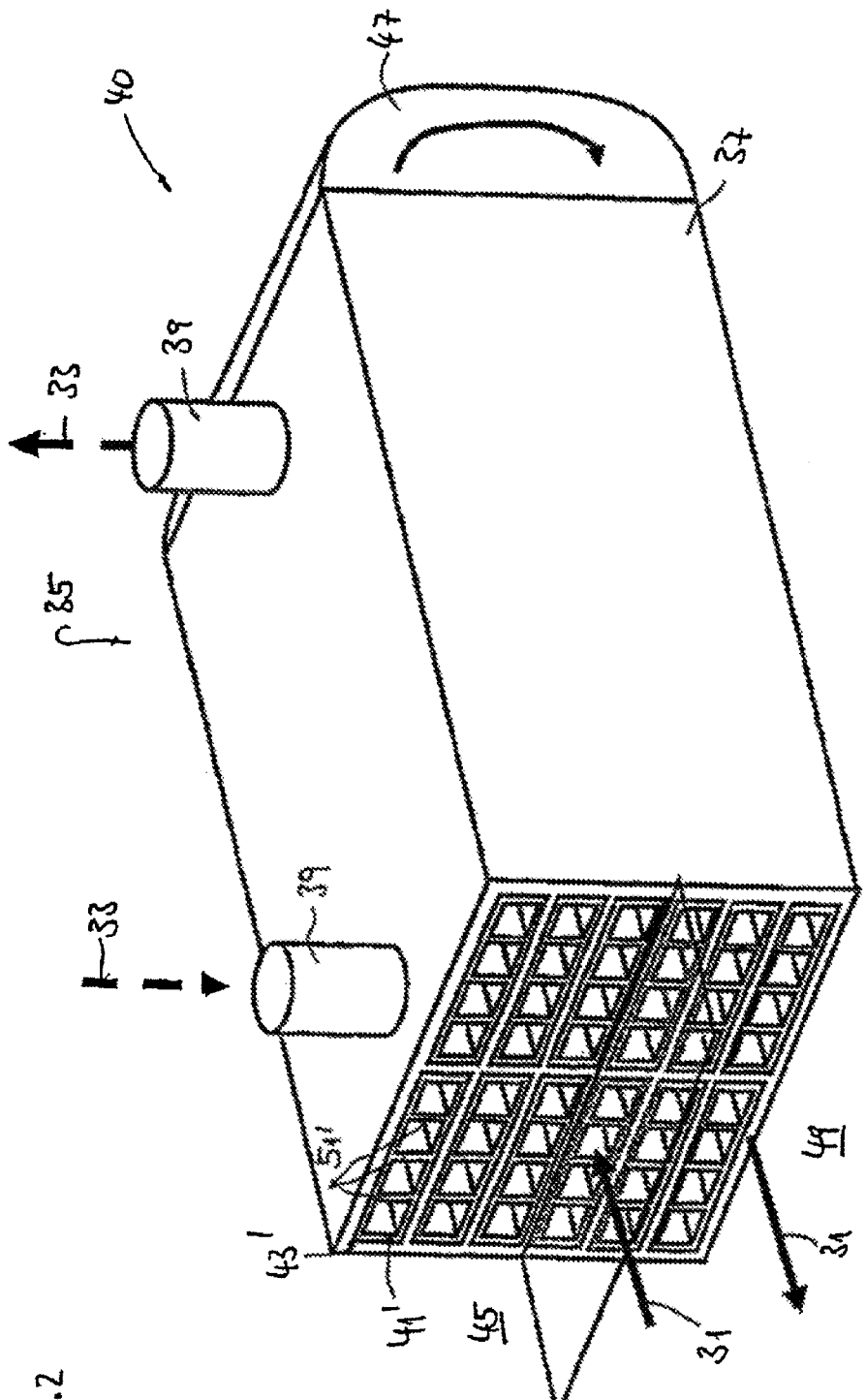
Fig. 4.2

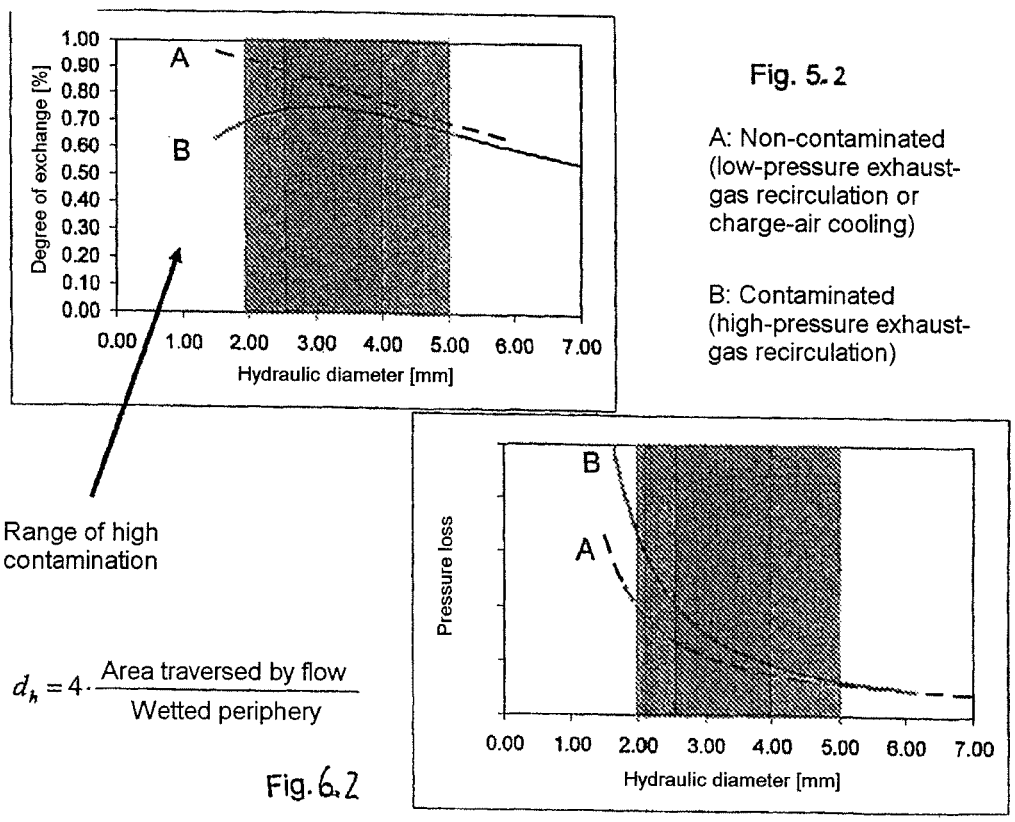

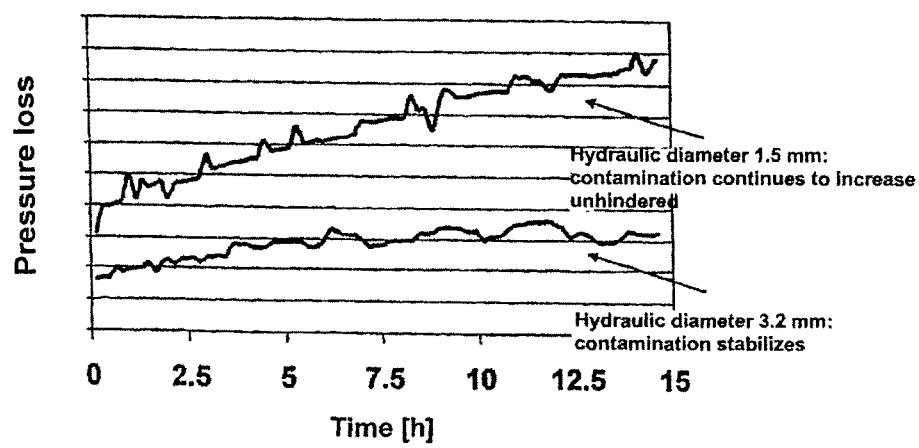
Fig. 7.2

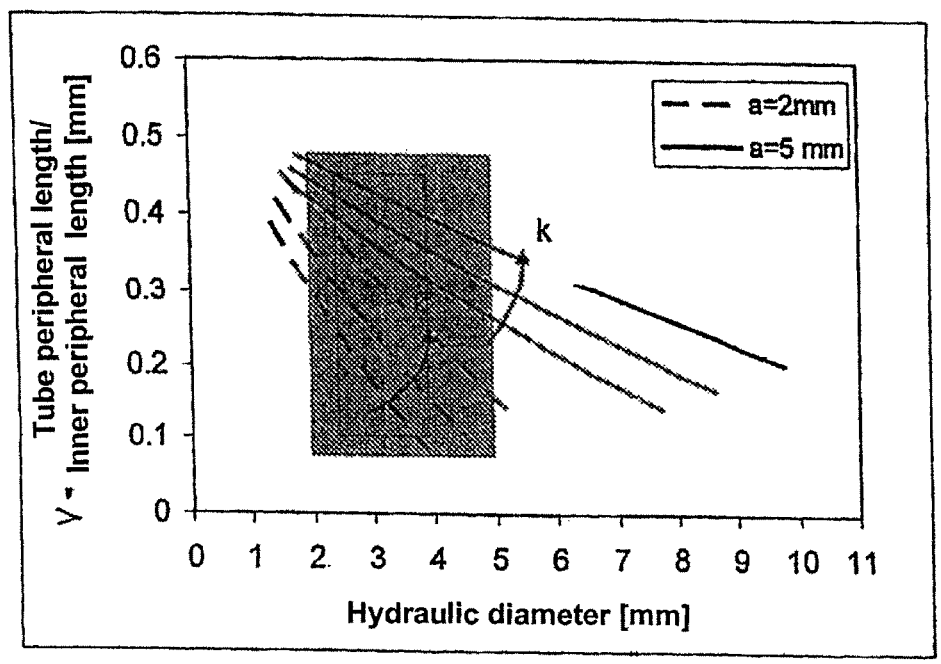
$$V = \frac{2 \cdot (c+h)}{(4 \cdot b + 4 \cdot a - 2 \cdot e + 2 \cdot d)}$$
Fig. 8.2

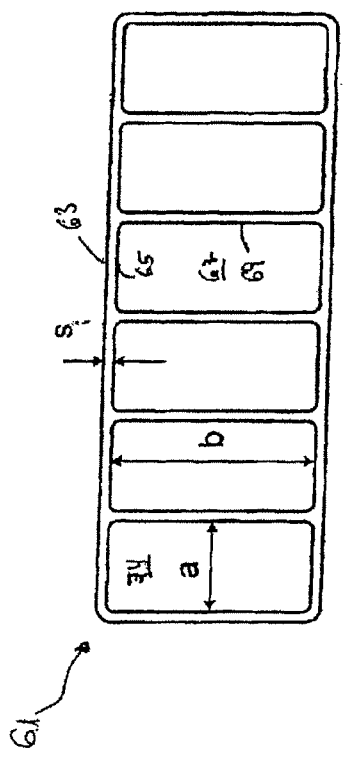
Fig.9A.2
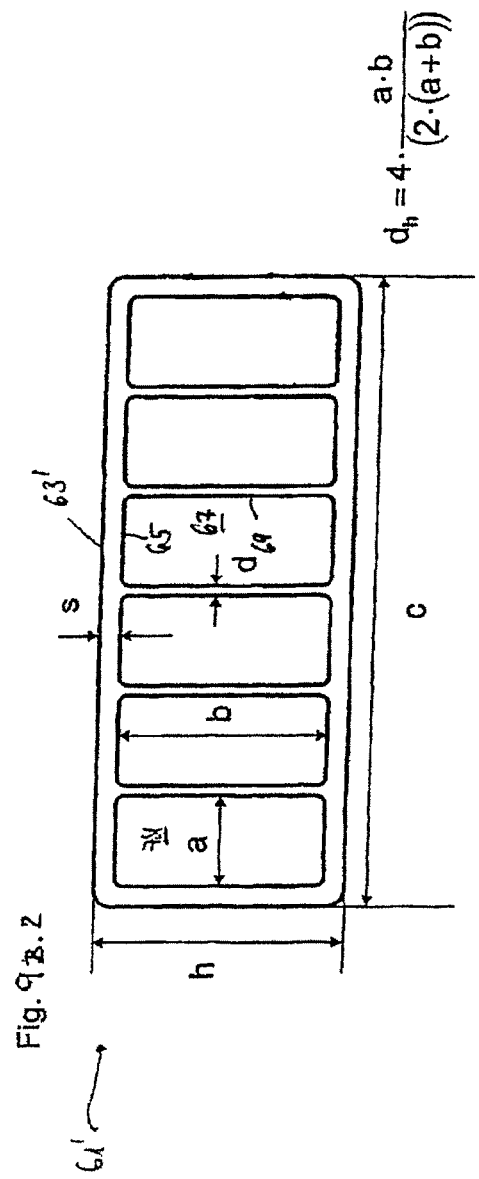
Fig.9B.2
$$d_h = 4 \cdot \frac{a \cdot b}{(2 \cdot (a+b))}$$

$$d_h = 4 \cdot \frac{2 \cdot (a_1 \cdot b + d \cdot e)}{(4 \cdot b + 4 \cdot a_1 - 2 \cdot e + 2 \cdot d)}$$

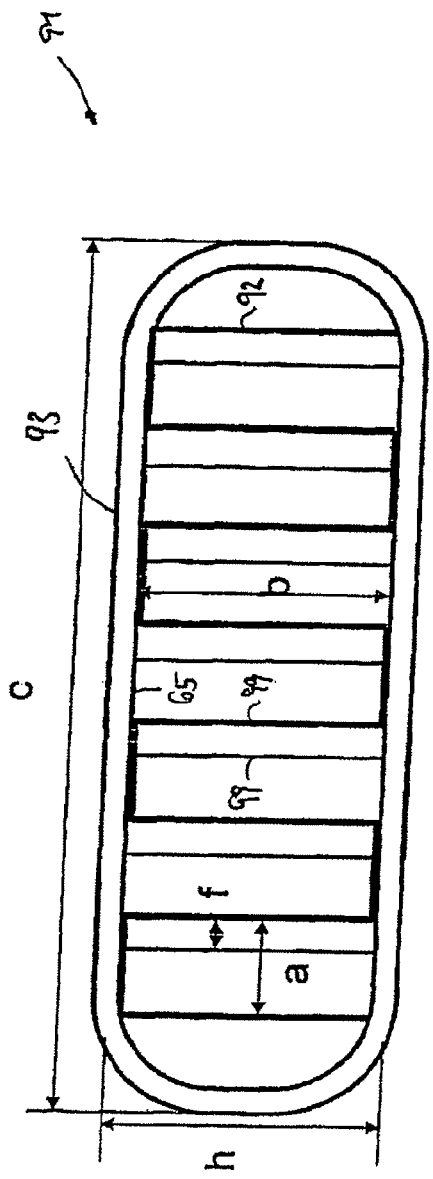
Fig. 12A.2
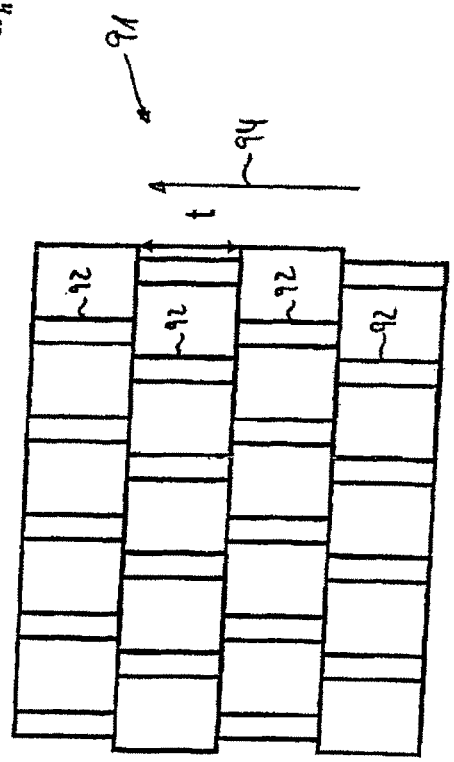
Fig. 12B.2

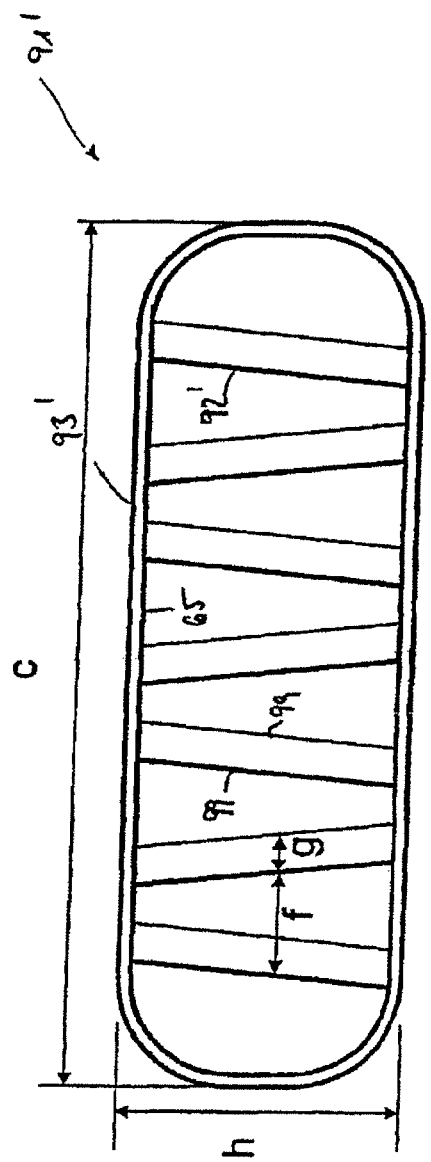
Fig. 13A.2
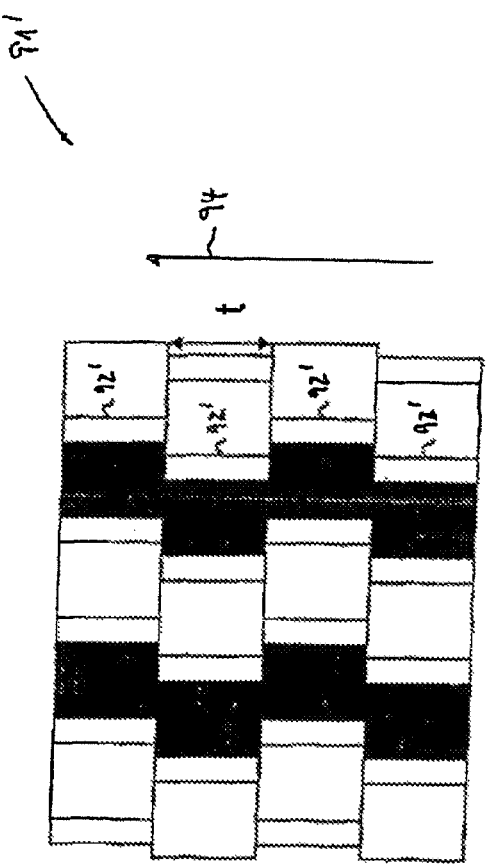
Fig. 13B.2

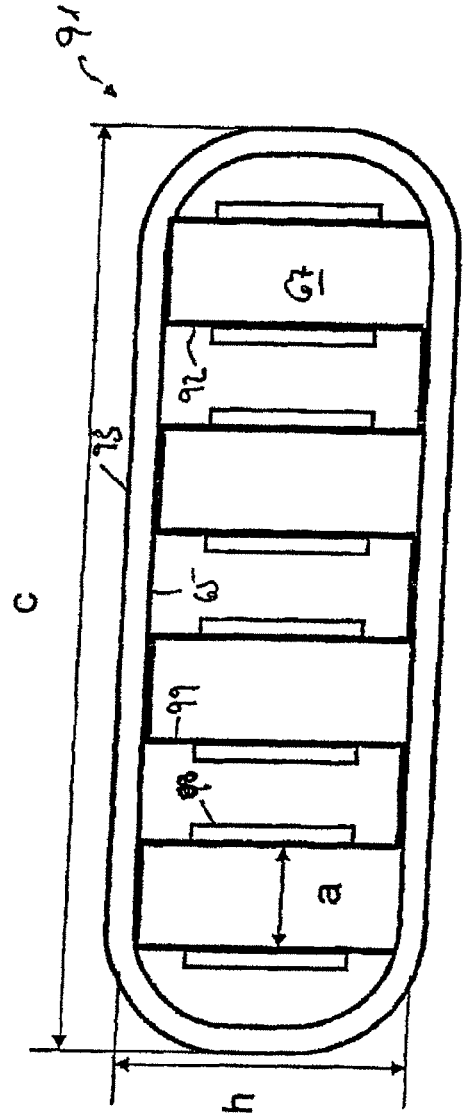
Fig. 14A.2
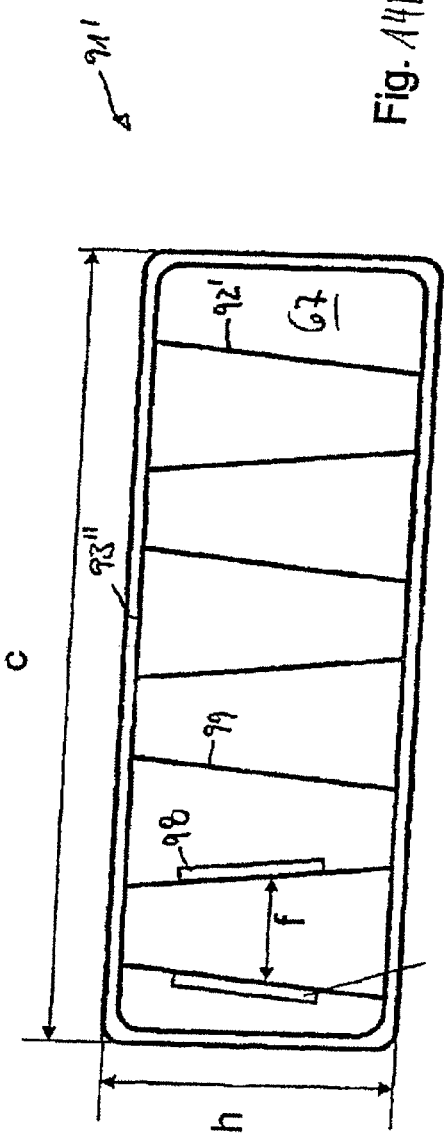
Fig. 14B.2

HEAT EXCHANGER FOR A MOTOR VEHICLE

The present invention relates, in a first variant, to a heat exchanger for a motor vehicle.

In a second variant, the invention also relates to a flow duct for a heat exchanger for an exchange of heat between a first fluid and a second fluid, having: a duct casing having an interior space which is surrounded by a duct casing inner side; a number of webs arranged in the interior space on the duct casing inner side, which flow duct has a cross section, which is designed for conducting the first fluid in the interior space and which can be traversed by flow, transversely with respect to a flow duct axis. The invention also relates to a heat exchanger for an exchange of heat between a first fluid and a second fluid, having: a block for the separate and heat-exchanging guidance of the first and second fluids, and a fluid connection for the first fluid; which block has a housing with a chamber which can be traversed by the second fluid and a block closure element for the preferably fluid-tight separation of the chamber and the fluid connection. The invention also relates to an exhaust-gas recirculation system, to a charge-air supply system and to a use of the heat exchanger.

In the construction of heat exchangers for motor vehicles, increasing demands are being made on the exchanger power for a limited installation space. In the case in particular of the cooling of exhaust gas for the purpose of recirculation to an internal combustion engine, it is also necessary here to overcome large temperature differences.

It is the object of the invention according to the first variant to specify a heat exchanger for a motor vehicle which has a high exchanger power for a limited installation space, with cost-effective production.

The flow duct specified in the introduction for use in a heat exchanger is known from DE 37 316 69 A1 from the applicant.

Heat exchangers of the type specified in the introduction have the task of cooling a hot first fluid by means of a relatively cold second fluid, in order that the first fluid, in particular an exhaust gas or exhaust-gas/air mixture or charge air can be admixed to the intake air for an internal combustion engine, for example of an engine. The second fluid may be a coolant, for example a liquid or gaseous or mixed liquid-gas coolant which can, at any rate in the case of a liquid coolant, be extracted from the cooling circuit of the internal combustion engine. It is fundamentally sought, in order to increase a thermodynamic efficiency, that the cooling takes place to as low a temperature level as possible. It is known that the concept of cooled exhaust-gas recirculation or cooled charge air can serve to reduce pollutants, in particular nitrogen oxides, in the exhaust gas.

With regard specifically to the demands of modern-day engines, it is possible by means of exhaust-gas recirculation coolers to meet the ever increasing demands on exhaust-gas purification. By cooling the exhaust gas and re-supplying the cooled exhaust gas, the combustion temperature in the engine is lowered and leads to reduced $NO_x$ emissions. Increasing demands on pollutant reduction result in the further development of known cooler concepts and the proposal of new cooler concepts.

A flow duct in a heat exchanger of known type may be produced from a steel or high-grade steel material. Here, the corrosion resistance of steel and high-grade steel materials has been proven in particular.

It has also been found that flow ducts composed of aluminum or based on an aluminum material can be produced in a very cost-effective manner.

In order to sufficiently improve an exchange of heat in a flow duct, a flow duct is generally fitted, as explained in the introduction, with a number of webs arranged in the interior space on the duct casing inner side. The number of webs can fundamentally contribute to an increase in the exchange of heat. However, if an excessive number of webs are used, the risk of blockage by soot particles, which are for example contained in the exhaust gas, increases considerably. It has been found that, where excessively narrow passage regions, which are defined substantially by the cross section which can be traversed by flow, are provided in the flow duct, a flow duct becomes contaminated comparatively quickly and, in the worst case, can become partially blocked. This process, as well as further measures for increasing an exchange of heat, also adversely increase the pressure loss generated in a flow duct, which is undesirable in the context of modern heat exchanger concepts.

In addition to the design of a flow duct disclosed in DE 37 316 69 A1 with an extruded duct casing, there are further types of design, as are known for example from DE 10 225 812 C1, G 94 065 59.4, DE 36 153 00 C2 and DE 202 05 200 U1. However, flow ducts specified in said documents are intended and designed specifically for a particular application. For example, U.S. Pat. No. 5,184,672 discloses a flow duct for a heat exchanger in the form of a condenser which is fitted with flat tubes through which a liquid coolant flows. U.S. Pat. No. 3,486,489 discloses an oil cooler which is fitted with flat tubes through which oil to be cooled flows. US 2005/0061488A1 discloses a heat exchanger which is designed for cooling oil and whose flow ducts are designed for conducting the oil to be cooled. The cross section, which can be traversed by flow, of the flow ducts described therein is designed specifically for being traversed by oil. In US 2005/0061488A1, the cross section which can be traversed by flow is characterized by a power ratio of between 3.9 and 8.5, which is defined as a ratio of a wetted periphery in mm to a traversable cross-sectional area of the metal tube in $mm^2$.

Such flow ducts which are designed for conducting liquid fluids are not suitable for use in a heat exchanger of the type specified in the introduction. The heat exchanger of the type specified in the introduction is designed in particular as an exhaust-gas heat exchanger and/or as a charge-air heat exchanger. In this case, the first fluid is gaseous or a vapor, that is to say for example an exhaust gas or an exhaust-gas/air mixture or charge air. In this case, the second fluid is a coolant, in particular a liquid or gaseous or mixed liquid-gas coolant. With regard to the problems explained above, it is desirable to realize an improved design concept for a flow duct.

The second variant of the invention addresses this; it is the object of said second variant to specify a flow duct which has an improved exchange of heat. Furthermore, it is sought in particular that an acceptable pressure loss can be obtained and in particular that a risk of blockage is reduced. It is also an object of the invention to specify an advantageous concept for an exchange of heat and an exhaust-gas recirculation system and a charge-air supply system and an advantageous use of the heat exchanger.

The object is achieved according to the invention, for the heat exchanger specified in the introduction according to the first variant. By means of the continuous design of the flow ducts which are separate from one another, it is possible to construct a so-called U-flow heat exchanger which ensures a good exchange of heat between the fluid conducted within the flow ducts and the exterior of the flow ducts even in its deflecting region, in contrast to previous known designs. Furthermore, a heat exchange of said type can be produced in a cost-effective and simple manner.

In one preferred embodiment, the fluid is exhaust gas of an internal combustion engine of the motor vehicle. The particular object of cooling generally very hot exhaust gas can be achieved particularly effectively by means of a heat exchanger according to the invention since said heat exchanger has a very high heat exchanger power for a given installation space. In addition, the separate, continuously guided flow ducts in the deflecting region can, in contrast to known solutions from the prior art, be thermally insulated particularly effectively with respect to surrounding parts of the vehicle, for example by means of a coolant-conducting outer housing. Alternatively, the fluid of the heat exchanger according to the invention may however also be charge air of an internal combustion engine of the motor vehicle or else lubricating oil from a lubricating oil circuit of the motor vehicle, or some other fluid to be cooled of the motor vehicle.

To obtain a simple design, the flow ducts are preferably fixed at the end side to a base element, with in each case both ends of the continuous flow ducts opening out in the base element.

Particularly effective cooling of the fluid can be obtained in that the flow ducts are arranged in a housing which can be traversed by an in particular liquid coolant. Here, the housing advantageously has an inflow and an outflow for the coolant, with one of the two, inflow or outflow, being arranged in the vicinity of the deflecting region of the flow ducts, in particular in the vicinity of an apex of the deflecting region. In this way, it is possible in a simple manner to obtain as complete and uniform a flow of coolant around all of the flow ducts as possible. To further improve the flow around said flow ducts, a guide element for guiding the coolant can preferably be arranged in the housing. Guide elements of said type can direct the flow to certain regions and/or can generate turbulence in the coolant.

It is also preferable for support means for holding the flow ducts to be arranged in the housing in order to limit vibration amplitudes of the flow ducts and to thereby prevent cracks from forming even in the event of intense vibrations. Because the support means are situated in a housing in liquid coolant, said support means may also be composed of a thermally undemanding material such as plastic in order to save on costs.

It is generally provided in order to save on production costs that the housing is composed substantially of a plastic.

To reduce production costs and to realize complex cross-sectional shapes in a simple manner, a flow duct is advantageously formed as an extruded profile. Here, at least two flow ducts are particularly advantageously provided within one extruded profile, with the extruded profile having an outer wall, around which coolant flows, and an inner wall which separates the flow ducts from one another. In this way, it is possible in a cost-effective and functionally reliable manner to provide a large contact area between the fluid and the heat-exchanging material of the flow duct. Here, the outer wall particularly preferably has, in cross section, an at least partially rounded profile for the purpose of better bendability. By means of said shaping, it is possible to provide an initially linearly-extruded extruded profile, in a further production step, with a sufficiently tightly curved deflecting region which is usually formed as a 180° bend piece. Alternatively, or in addition, it is possible for the inner wall, at least in a non-bent state of the extruded profile, to have a thickness which varies over its length, with in particular a thin region being assigned to a small bend radius. It is likewise possible in this way to improve the bendability of the bundle of flow ducts. Such complex designs of a cross-sectional shape do not entail any particular expenditure specifically when using extruded profiles. Here, the thickness ideally increases outward from 0.2 . . . 1.5 mm by 1.2 to 2 times.

A plurality of extruded profiles are generally preferably provided in order to ensure an effective exchange of heat between the coolant and flow ducts.

The extruded profile is advantageously composed of an aluminum-based alloy. Aluminum has extremely good corrosion resistance and can be extruded in a cost-effective manner in almost any desired cross-sectional shapes. Where sufficient cooling is provided, aluminum may by all means be used in the construction of exhaust-gas heat exchangers.

In one preferred detail design, one of the flow ducts is an outer flow duct and another of the flow ducts is an inner flow duct, with the inner flow duct having a smaller deflection radius than the outer flow duct in the deflecting region. Here, the inner flow duct particularly preferably has a greater wall thickness than the outer flow duct, such that, overall, weight and material quantity are optimized with regard to the mechanical demands during the production of the heat exchanger, and in particular during the bending of the flow ducts.

To improve the exchanger power for a given installation size, turbulence-generating means are advantageously provided in at least one of the flow ducts. The turbulence-generating means particularly preferably vary over a course of the flow duct, with in particular a flow resistance increasing over the course of the flow duct. This permits fine-tuning of the exchanger power taking into consideration that the temperature difference between the fluid and surrounding coolant decreases over the course of the flow path, such that an optimum adaptation of the exchanger power per unit length of the flow duct is positively associated with a variation in the flow resistance or the proportion of turbulence generated in the fluid flow. Such an adaptation can consist even in providing different turbulence-generating means in the region of the first flow path than in the region of the second flow path and/or in the deflecting region.

In an alternative embodiment, a flow duct has two straight sections of a tube, with a bend piece being connected to the two straight sections an in the deflecting region. Depending on the type and material of the flow ducts, it is possible to simplify production in this way.

The flow ducts generally preferably have a corrosion-inhibiting coating. Such coatings are expedient in particular in the event of the heat exchanger being designed as an exhaust-gas heat exchanger, in order to lengthen the service life of the heat exchanger.

Furthermore, at least one flow duct of the first flow path can bear adjacently against a flow duct of the second flow path in the deflecting region, with the deflecting region being designed as a separate element which is placed on ends of the two flow ducts in order to connect them. For inner flow ducts in particular, with a correspondingly small deflecting region, this offers a space-saving solution with simultaneously relatively small wall thicknesses. Furthermore, the spacing between flow ducts which are adjacent to one another in the connecting region can in this way be designed to be particularly small, which leads overall to a small design of the heat exchanger.

In one preferred embodiment, in at least one of the flow ducts, at least in a non-bent state, an inner wall in relation to a bend in the deflecting region has a smaller wall thickness than an outer wall in relation to the bend. In this way, it is possible to obtain a particularly tight bend radius in the deflecting region. The wall thicknesses of the outer bend region are preferably 1.2-2 times, but at best 1.5 times, those of the inner wall region in the bend. Here, the wall thickness in the inner bend radius should preferably be in the region of 0.42 mm, ideally approximately 1 mm.

In a further preferred design, a first continuous flow duct runs in a first plane, with a second continuous flow duct intersecting the plane in particular in the deflecting region. Here, the first flow duct and the second flow duct have in particular a different length. It is possible by means of this measure, too to reduce an empty intermediate space, which does not contribute to the exchanger power, between adjacent flow ducts, such that the installation size is reduced overall for a given exchanger power.

The use of extruded profiles to form the flow ducts very generally permits cost-effective production, wherein, as a result of the large degree of freedom in the cross-sectional shaping of extruded profiles, it is possible in a simple manner to provide flow ducts with a good exchange of heat between fluid to be cooled and an outer coolant. These advantages fundamentally also apply to heat exchangers of straight design or of some other design than U-flow design.

The object relating to the flow duct is achieved by means of a flow duct of the type specified in the introduction in which is provided, according to the invention, a hydraulic diameter, defined as four times the ratio of the area of the cross section which can be traversed by flow to a periphery wetted by the first fluid, which is in a range between 1.5 mm and 6 mm.

The invention is based on the consideration that, in a flow duct according to the concept of the invention, a certain range with respect to the hydraulic diameter should not be exceeded or undershot. The invention has recognized that, in the event of the hydraulic diameter being selected, for example, to be too large, a passage for the first fluid, in particular an exhaust gas or exhaust-gas/air mixture or charge air, is duly large enough to avoid blockage problems or significant contamination problems, or if appropriate to keep the pressure loss low. However, in the event of a hydraulic diameter being selected to be too large, an exchange of heat is reduced. In the inverse case of a hydraulic diameter being selected to be too small, it is duly possible that a flow duct initially provides a sufficient exchange of heat. In such a case, however, a passage in the cross section which can be traversed by flow which is selected to be too small will become contaminated comparatively quickly, and in the worst case become blocked, but at any rate lead to an increased pressure loss, during operation. This would then lead to a considerable decrease in the heat exchanger power of a heat exchanger. Furthermore, a pressure loss will increase disproportionately in the event of parts of a flow duct becoming excessively contaminated or even blocked.

According to the concept of the invention, the range of a hydraulic diameter according to the invention has proven to be superior to known concepts. A flow duct according to the concept of the invention makes it possible to provide a sufficient exchange of heat in a heat exchanger and to nevertheless ensure an acceptable pressure loss with a simultaneously reduced risk of blockage.

In particular, it has also been proven in a flow duct according to the concept of one particularly preferred refinement of the invention that said flow duct has an increased level of corrosion resistance on account of the extruded duct casing. It is also possible to provide additional corrosion protection in a flow duct produced in this way or in some other way. The flow duct according to the concept of the invention permits an improved solution for a heat exchanger with regard to heat exchanger power, pressure loss and contamination, and simultaneously cost-saving use of comparatively corrosion-resistant materials, in particular extruded aluminum materials.

Advantageous refinements of the invention can be gathered with advantageous possibilities for realizing the above-explained concept within the context of the set problem and with regard to further advantages.

A hydraulic diameter in a range between 2 mm and 5 mm has proven to be particularly preferable for realizing the concept of the invention. The size of said range particularly advantageously realizes—as explained in detail on the basis of FIG. 5, FIG. 6, FIG. 7 and FIG. 8—a compromise between the tendency to realize as effective an exchange of heat as possible in a flow duct, and the tendency on the other hand to reduce a pressure loss, or realize an acceptable pressure loss while nevertheless providing an effective exchange of heat. In this connection, a hydraulic diameter in the range between 3 mm and 3.4 mm, in particular between 3.1 mm and 3.3 mm, has proven to be more particularly preferable. With regard in particular to the latter range of a hydraulic diameter between 3.1 mm and 3.3 mm, it has been found that a hydraulic diameter of approximately 3.2 mm is particularly expedient. Although it is fundamentally not possible in the stated range to prevent contamination of the flow duct, in particular of the heat exchanger tube, tests have however shown that, in said range, contamination of the flow duct stabilizes in such a way that a decrease in power is also kept to a comparatively low level. While it is to be expected that, in ranges of the hydraulic diameter outside the above-specified ranges, a flow duct will become increasingly contaminated the longer it is operated, it is to be assumed that, in the preferred ranges of a hydraulic diameter as specified above of proven dimensions, a pressure loss stabilizes at a comparatively low level. A possible suboptimal heat exchanger power of a heat exchanger is not reduced further with continued operation of the heat exchanger. In ranges of a hydraulic diameter outside those stated above, however, a disproportionate increase in pressure loss, and ultimately in the worst case a blockage of the flow duct, occurs during continued operation of the flow duct.

A flow duct according to the concept of the invention can advantageously be used both within the context of high-pressure exhaust-gas recirculation, as explained in more detail with reference to FIG. 1.2, and also within the context of low-pressure exhaust-gas recirculation, as explained in more detail with reference to FIG. 2.2. Furthermore, an application for charge-air cooling is also possible. In all fields of application, in particular those stated or others, an increase in the number of webs to improve the exchange of heat is avoided, according to the concept of the invention, by virtue of the hydraulic diameter being selected in a range between 1.5 mm and 6 mm. However, it has been found in tests that an optimum selection of a range for the hydraulic diameter can be different for low-pressure exhaust-gas recirculation, high-pressure exhaust-gas recirculation or charge-air cooling. In the case of high-pressure exhaust-gas recirculation, as has been proven, both the increase in a pressure loss and also the increased risk of blockage or significant contamination of a flow duct with soot particles or the like are relatively critical. For a high-pressure heat exchanger, a range of a hydraulic diameter of between 2.5 mm and 4 mm, in particular between 2.8 mm and 3.8 mm, has proven to be particularly advantageous.

In a low-pressure exhaust-gas recirculation concept, the increase in the pressure loss has proven to be particularly critical, since said pressure loss should preferably be kept particularly low within the context of a low-pressure application. For a low-pressure heat exchanger, a range of a hydraulic diameter of between 2 mm and 3.5 mm, in particular between 2.5 mm and 3.5 mm, has proven to be particularly advantageous.

It has proven to be particularly advantageous, in particular in order to increase a level of corrosion resistance, to select a ratio of a web thickness and a duct casing thickness to be less than a value of 1.0. In other words, to increase the level of corrosion resistance, it is advantageous to provide the duct casing with a greater wall thickness than a web. This is advantageous in particular with regard to the design of a flow duct in which at least one duct casing is produced on the basis of an aluminum material.

Furthermore, it has proven to be fundamentally relevant to optimize a duct casing thickness in such a way as to firstly ensure a sufficient level of corrosion resistance, in particular in the case of a flow duct based on an aluminum material, and secondly provide a sufficient number of flow ducts in the available installation space of a heat exchanger. An installation space for a heat exchanger in an engine is usually comparatively limited, such that it falls fundamentally within the scope of an improvement to provide as many flow ducts in a heat exchanger as possible, and therefore to design a duct casing thickness not to be excessively thick. According to a particularly preferred refinement of the invention, a ratio of the hydraulic diameter and a duct casing thickness in a range between 0.8 and 8 has proven to be particularly advantageous. Said range has proven to be particularly expedient in particular in a flow duct based on an aluminum material, in particular in a flow duct in which at least the duct casing is based on an aluminum material. Also advantageous is a range between 1.2 and 6, in particular a range between 1.4 and 6, with regard to the design of the duct casing thickness (installation space requirement, corrosion resistance) and the hydraulic diameter (heat exchange, pressure loss).

The concept of the invention, and/or one or more of the above-specified refinements individually or in combination, has proven to be particularly advantageous for dimensions of a flow duct which realize a ratio of the periphery wetted by the first fluid and an outer periphery of the flow duct in a range between 0.1 and 0.5. The tests carried out in this regard have shown that, within the range of the specified dimensions, the behavior of a flow duct is particularly advantageous with regard to the above-explained problem.

A flow duct according to the concept of the invention may fundamentally be realized in numerous forms, in particular as an extruded profile. With regard to production aspects and the problem specified above, a flow duct in which a web as a full web in tube cross section is arranged at one end and at the other end on the duct casing inner side. In particular, a tube cross section may have only full webs. A full web is advantageously guided continuously, without openings, between a first duct casing inner side and a second duct casing inner side. As is explained by way of example on the basis of FIG. 9A.2 and 9B.2, it is possible in this way to realize a flow duct with a hydraulic diameter as per the concept of the invention.

Furthermore, a flow duct has proven to be advantageous in which a web as a partial web in tube cross section is arranged only at one end on the duct casing inner side and at the other end projects freely into the interior space. As explained by way of example on the basis of FIG. 10A.2 and FIG. 10B.2 and also FIG. 11A.2 and FIG. 11B.2, it is particularly advantageously possible by means of an extruded flow duct to realize a hydraulic diameter as per the concept of the invention.

It has been proven that advantageously two partial webs are arranged with opposing end sides at the other end. Alternatively, or in combination with the above-specified arrangement of partial webs, it is possible for two partial webs to be arranged with end sides which are laterally offset with respect to one another at the other end. It is preferable for a partial web and a full web to be arranged alternately adjacent to one another.

It has proven to be particularly advantageous for dimensions and arrangements of the partial webs to be arrived at as follows. According to one particularly preferred refinement, a ratio of a spacing between two partial webs, which are in particular opposite one another and/or offset with respect to one another, to a height of the tube cross section is in a range below 0.8, in particular in a range between 0.3 and 0.7. A ratio of a spacing of a first partial web to a full web to a spacing of a second partial web to the full web is preferably in a range between 0.5 and 0.9, in particular in a range between 0.6 and 0.8.

The duct casing, preferably the entire flow duct, is preferably composed of an aluminum-based material.

Alternatively, additionally or in combination, said material may also be a steel-based, in particular high-grade-steel-based material.

The duct casing may preferably be formed as a tube, in particular as a welded tube and/or soldered tube or extruded tube. A flow duct may for example be produced from a sheet-metal strip which is shaped to form a tube and which is then welded or soldered longitudinally. Furthermore, a flow duct may also be formed by disks or plates which are connected to one another. In particular, at least the duct casing, in particular the entire flow duct, is formed as an extruded profile.

In the case of an extruded flow duct based on an aluminum material, it has been proven that its corrosion-resistance properties are comparatively good. This is to be attributed inter alia to a comparatively small grain structure resulting from the extrusion, and comparatively smooth surface. This has the result that even acidic exhaust-gas condensates are opposed by a sufficient level of corrosion resistance for the demands of modern heat exchanger concepts.

According to one particularly preferred first refinement of the invention, at least one web of the number of webs, preferably all the webs, is a web which is extruded with the duct casing.

According to a particularly preferred second refinement of the invention, at least one web of the number of webs, preferably all the webs, is a web which is produced separately from the duct casing and which is connected to the duct inner side. A web is preferably further integrally formed and/or molded and/or shaped. This has proven to be particularly expedient in order to take further measures in an extruded web to attach flow-conducting elements or turbulence-generating elements. A web is preferably arranged so as to run parallel to a flow duct axis. It is however fundamentally also possible to generate, during an extrusion process, webs which run in a corrugated fashion along the flow duct axis. Primarily with regard to the configuration of an extrusion process, it has proven to be expedient to design a web to be continuous along a flow duct axis.

With regard in particular to the second refinement of the invention, it is possible for a web to be inserted, in particular pushed, into the duct casing—for example as disclosed in DE 37 31 69 A1.

A web according to the second refinement is preferably cohesively connected to the duct inner side. In particular, it has proven to be advantageous to solder, weld and/or adhesively bond a web to the duct inner side. A web produced separately from the duct casing, according to the second refinement, can be milled, punched and/or rolled.

Within the context of one particularly preferred refinement of the invention—in particular with regard to a refinement in which at least the duct casing, preferably the entire flow duct is produced on the basis of an aluminum material—it is possible to provide at least one web and/or the duct casing, preferably the duct casing inner side, with a corrosion prevention arrangement. A corrosion prevention arrangement may particularly advantageously be provided in the form of a zinc coating and/or a lacquer.

The duct casing may fundamentally be formed to be of any desired suitable shape. The duct casing is particularly preferably formed in the manner of a tube, preferably an extruded tube. Flat tubes in particular have proven to be expedient in modern designs of heat exchanger. A duct casing in the form of a tube formed by two disks which are joined to one another is also suitable. A tube cross section may fundamentally be selected to be of one of numerous possible shapes—a rectangular, oval or semi-oval tube cross section has proven to be particularly advantageous.

According to the second refinement of the invention, a web may be formed as a part of a profile with corrugated, in particular rectangularly corrugated or trapezoidally corrugated cross section. The formation of profiles of said type is particularly simple and has also proven to be particularly advantageous with regard to increasing the exchange of heat.

According to the second refinement of the invention, it is preferably possible for a number of profiles which are corrugated in cross section to be arranged in series along a flow duct axis—this is explained for example with reference to FIG. 12A.2, FIG. 12B.2 and also FIG. 13A.2, FIG. 13B.2.

A web may fundamentally have flow conducting elements and/or turbulence elements of a variety of types, wherein the design and selection of elements of said type may be carried out according to the desired purpose and use of the flow duct. Particularly advantageous is a flow conducting element and/or a turbulence element selected from the group consisting of: a number of interruptions and/or openings along a flow duct axis, in particular as punched-out portions, convexities, such as gills or the like; a number of corrugations, preferably in the flow direction; a number of web openings which are offset relative to one another, in particular offset relative to one another in the flow direction, so as to form a web fin. Exemplary possibilities are explained with reference to FIG. 14A.2, FIG. 14B.2.

In one particularly preferred refinement according to the concept of the invention, a number of 2 to 20, in particular 5 to 15, in particular 7 to 12, in particular 8 to 11, in particular 9 webs are arranged adjacent to one another so as to be distributed over a tube cross section.

With regard to the heat exchanger, the object is achieved by the invention according to the second variant by means of a heat exchanger of the type specified in the introduction, in which it is provided according to the invention that the block has a number of flow ducts according to concept of the invention, which flow ducts can be traversed by the first fluid, and with the fluid connection being flow-connected to the flow ducts. The housing preferably holds the flow ducts.

A flow duct according to the concept of the invention can advantageously be used both in a heat exchanger of the first variant of the invention and also in a heat exchanger of the second variant of the invention.

The block closure element is preferably in the form of a base with one or with a plurality of passage openings for the flow ducts.

It is preferably possible for in each case one separate, with regard to the first fluid, inlet-side and outlet-side block closure element to be provided. This is the case in particular in a heat exchanger of so-called I-flow design. Here, the first fluid is supplied to the heat exchanger at a first side and is discharged at a second side.

In addition, or alternatively, a block closure element may have an inlet region and an outlet region for the first fluid. This relates in particular to a heat exchanger of so-called U-flow design, in which the first fluid is supplied at a first side and is discharged at the same side in the opposite direction.

A fluid connection may preferably be formed in the manner of a diffuser, in particular an inlet diffuser and/or outlet diffuser.

The invention also encompasses an exhaust-gas recirculation system for an internal combustion engine, having an exhaust-gas recirculation line, a compressor and, according to the invention, a heat exchanger according to the concept of the invention in the form of an exhaust-gas heat exchanger, in particular exhaust-gas cooler.

In terms of the exhaust-gas recirculation, a fundamental distinction is made between high-pressure recirculation, as is explained in more detail by way of example with reference to FIG. 1.2, and low-pressure recirculation, as is explained in more detail by way of example with reference to FIG. 2.2. In the case of high-pressure recirculation, an exhaust-gas heat exchanger is arranged at a high-pressure side, that is to say an outlet side of an internal combustion engine.

In the case of low-pressure recirculation, an exhaust-gas heat exchanger is arranged on a low-pressure side of an internal combustion engine, that is to say is arranged upstream in particular at an inlet side of an internal combustion engine. With regard to these possibilities, reference is made primarily to the above-specified different possible configuration of a hydraulic diameter specifically for these possibilities.

The invention also encompasses a charge-air supply system for an internal combustion engine, having a charge-air intake line, an air filter, a compressor and, according to the invention, a heat exchanger according to the concept of the invention in the form of a charge-air heat exchanger, in particular charge-air cooler.

The invention also encompasses a use of the heat exchanger according to the concept of the invention for an internal combustion engine, in particular a diesel engine, of a motor vehicle, in particular of a utility vehicle or passenger vehicle.

The invention also encompasses a use of the heat exchanger according to the concept of the invention for an internal combustion engine, in particular a spark-ignition engine, of a motor vehicle, in particular of a passenger vehicle or utility vehicle.

The application of the concept of the invention to a two-stage heat exchanger has proven to be particularly preferably. The second fluid may fundamentally be a liquid coolant or a gaseous or mixed liquid-gas coolant. In one preferred application, the concept of the invention may be realized in a two-stage heat exchanger which is cooled in the first stage by means of a liquid coolant and in the second stage by means of a gaseous or aeriform coolant. A flow duct according to the concept of the invention may be used solely in the first stage of the heat exchanger or in solely the second stage of the heat exchanger or in both stages of the heat exchanger, and may be adapted with regard to the pressure and temperature conditions characteristic of the stages.

Exemplary embodiments of the invention are now explained below on the basis of the drawings. Said drawings are intended to illustrate the exemplary embodiments not necessarily to scale; the drawings are in fact shown in schematized and/or slightly distorted form where appropriate for explanation. With regard to enhancements of the teaching which can be directly gathered from the drawings, reference is made to the relevant prior art. Here, it is to be taken into consideration that various modifications and changes relating to the shape and details of an embodiment may be carried out without departing from the general idea of the invention. The features of the invention disclosed in the above description and in the drawings can be essential both individually and also in combination for the refinement of the invention. Furthermore, the scope of the invention also encompasses all combinations of at least two of the features disclosed in the description and in the drawings. The general idea of the invention is not restricted to the precise shape or the detail of the preferred embodiment shown and described below, or restricted to a subject matter which would be restricted in relation to the subject matter claimed in the claims. Where dimensional ranges are specified, values which fall within the specified limits are also intended to be disclosed as limit values and usable and claimable in any desired manner.

Further advantages and features may be gathered from the exemplary embodiments described below.

A plurality of preferred exemplary embodiments of a heat exchanger according to the invention according to the first and second variants are described below and explained in more detail on the basis of the appended drawings, wherein features of the first and second variants may be combined with and complement one another in any desired manner.

First Variant:

FIG. 1.1 is a general schematic three-dimensional illustration of a U-flow heat exchanger, FIG. 2.1 shows a schematic plan view of a first exemplary embodiment of a heat exchanger according to the invention, FIG. 3.1 shows a schematic plan view of a modification of the heat exchanger from FIG. 2.1, FIG. 4.1 shows a connection-side plan view of a second exemplary embodiment of a heat exchanger according to the invention, FIG. 5.1 shows a connection-side plan view of a third exemplary embodiment of a heat exchanger, FIG. 6.1 shows a connection-side plan view of a fourth exemplary embodiment of a heat exchanger, FIG. 7.1 shows a connection-side plan view of a fifth exemplary embodiment of a heat exchanger, FIG. 8.1 shows a schematic plan view of an advantageous modification of the heat exchanger from FIG. 2.1, FIG. 9.1 shows a schematic section view through a fully-assembled heat exchanger as per FIG. 1.1, FIG. 10.1 shows a three-dimensional illustration of a sixth exemplary embodiment of a heat exchanger according to the invention, FIG. 11.1 shows a plan view of the heat exchanger from FIG. 10.1 with an outer housing omitted, FIG. 12.1 shows a detail view of a modification of the heat exchanger from FIG. 10.1, FIG. 13.1 shows a connection-side plan view of a seventh exemplary embodiment of a heat exchanger according to the invention, FIG. 14.1 shows a connection-side plan view of an eighth exemplary embodiment of a heat exchanger according to the invention.

Figure 10A:
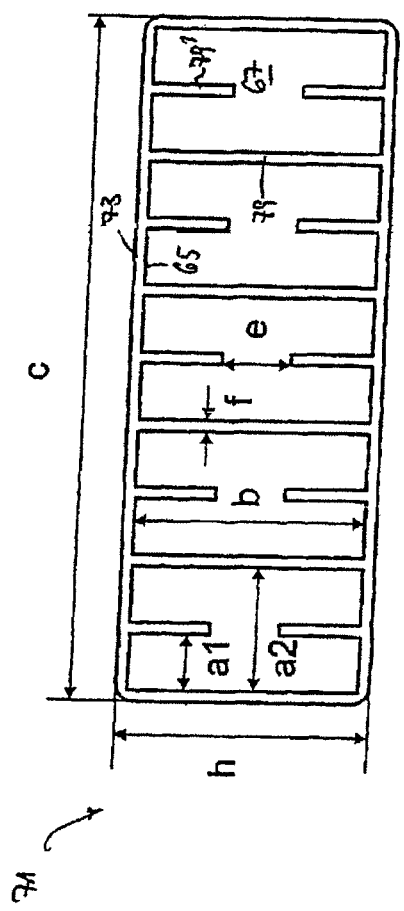
Figure 10B:
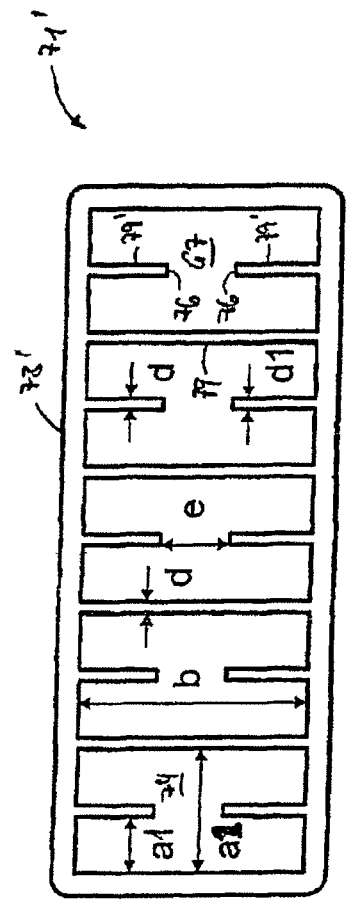
Figure 11A:
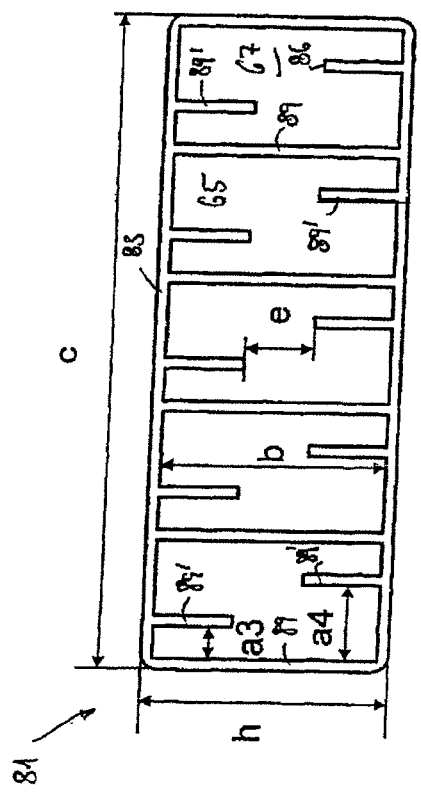
Figure 11B:
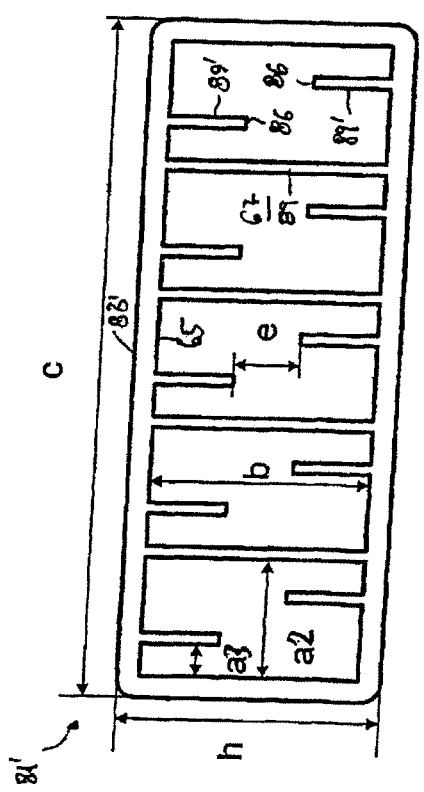

Second Variant:

In the drawing:

FIG. 1.2 shows an exhaust-gas recirculation system for an internal combustion engine with high-pressure recirculation, according to one particularly preferred embodiment, FIG. 2.2 shows an exhaust-gas recirculation system for an internal combustion engine with low-pressure recirculation, according to a further particularly preferred embodiment, FIG. 3.2 shows a heat exchanger of I-flow design, according to one particularly preferred embodiment, FIG. 4.2 shows a heat exchanger of U-flow design, according to one particularly preferred embodiment, FIG. 5.2 shows an illustration, based on measurements and calculations, of the preferred selection of a hydraulic diameter with regard to an improved exchange of heat in a heat exchanger, FIG. 6.2 shows an illustration, based on measurements and calculations, of the preferred selection of a hydraulic diameter with regard to a pressure loss reduced to the greatest possible extent, or an acceptable pressure loss, FIG. 7.2 shows a verification, based on measurements, of a preferred range of a hydraulic diameter, in which a stabilization of a pressure loss at a certain level is to be expected even with progressing operating duration of the flow duct, FIG. 8.2 shows an illustration, based on measurements and calculations, of the preferred selection of a hydraulic diameter with regard to the ratio of the periphery wetted by the first fluid and an outer periphery of the flow duct,

FIG. 9A.2;

FIG. 9B.1 show two modifications of a preferred embodiment of a cross section through a flow duct having an extruded duct casing and having webs extruded with the duct casing,

FIG. 10A.2;

FIG. 10B.2 show two modifications of a further embodiment as in FIG. 9A.2 and FIG. 9B.2, with partial webs,

FIG. 11A.2;

FIG. 11B.2 show two modifications of a further embodiment as in FIG. 9A.2 and FIG. 9B.2, with partial webs,

FIG. 12A.2;

FIG. 12B.2 show a cross-sectional view and a plan view of an embodiment in which the webs are produced separately from the duct casing and which are connected to the duct casing inner side,

FIG. 13A.2;

FIG. 13B.2 show a modification of the embodiment in FIG. 12A.2 and FIG. 12B.2, FIG. 14A.2 shows a modification of the embodiment in FIG. 12A.2 and FIG. 12B.2, with gills as flow conducting elements, FIG. 14B.2 shows a modification of the embodiment in FIG. 13A.2 and FIG. 13B.2, with gills as flow conducting elements.

FIG. 1.1 shows, in a generally schematic fashion, a heat exchanger of U-flow design for cooling recirculated exhaust gas of a motor vehicle diesel engine. The schematic heat exchanger as per FIG. 1 may both correspond to the prior art and also conform to the invention. A first flow path 1 and a second flow path 2 run parallel and adjacent to one another within a housing 3. The housing 3 is traversed, by means of two connections 4, 5, by a liquid coolant which is branched out of a main cooling circuit of the diesel engine. The flow paths 1, 2 comprise in each case a plurality of flow ducts 6, 7 which are formed in the present case as flat tubes of rectangular cross section. The cross section may fundamentally also have some other shape, for example round.

The liquid coolant flows around each of the tubes 6, 7 within the housing 3. A connecting region 8 is arranged at a front connecting side of the housing 3 and is connected thereto by means of welding; said connecting region 8 is illustrated separately from the housing 3 in FIG. 1.1 for clarity. The connecting region 8 has a first connection for supplying exhaust gas of a diesel engine of the motor vehicle, and a second connection 10 for discharging the cooled exhaust gas. Provided within the connecting region 8 is a positioning element 11 which can be adjusted by means of a rotary shaft 12. In a first position of the positioning element 11 as per FIG. 1.1, the exhaust gas is conducted from the first connection 9 into the first flow path 1, where said exhaust gas is initially subjected to first cooling. After flowing through the first flow path 1, the exhaust gas passes into a deflecting region 13 which is arranged at the end side of the housing 3.

In the prior art, the deflecting region is formed as a hollow housing part in which the exhaust-gas flow is deflected by 180°, after which it enters into the second flow path 2; in the prior art, the flow ducts 6, 7 are separate, straight tubes which are commonly held at their two end sides in each case one base piece. The fluid from the individual flow ducts is thus merged in the deflecting region 13, and practically no exchange of heat between the exhaust gas and coolant takes place in the deflecting region.

The exhaust gas flows through the second flow path 2 in the opposite direction to the first flow path 1, with said exhaust gas being subjected to further cooling. When it leaves the second flow path 2, the exhaust gas passes into the connecting region 8 again, where it is conducted into the second connection 10 in the event of the positioning element 11 being in the position shown in FIG. 1. In another position (not illustrated) of the positioning element 11, the exhaust gas is prevented from flowing through the flow paths 1, 2 and is conducted directly from the first connection 9 into the second connection 10. Here, said exhaust gas undergoes no significant cooling, such that this operating mode is assigned primarily to certain operating conditions such as for example a warm-running phase of the internal combustion engine ("bypass operation").

In the first exemplary embodiment according to the invention as per FIG. 2.1, the flow ducts 6 are formed as continuous tubes which start in the inlet region of the first flow path 1, are bent by 180° in the deflecting region 13 with in each case different radii of curvature, and after passing through the second flow path, end in the outlet region. Each of the flow ducts 6 therefore has only two ends, an inlet-side end and an outlet-side end. Both ends in each case are held in a single base element 14 and are welded therein in a gas-tight fashion.

In this way, not only are production costs saved on account of the simpler production, but increased functional reliability and a smaller quantity of scrap is generated on account of the smaller number of weld points. Furthermore, the deflecting region 13 actively contributes to cooling the exhaust gas, since the exhaust gas interacts even in the deflecting region with the coolant flowing around the flow ducts 6.

In the modification as per FIG. 3.1, the flow ducts are not originally formed in one piece, but rather comprise in each case one first, straight flow duct section 6 of the first flow path 1, a bend piece 13a which is bent through 180° and which is assigned to the deflecting region 13, and a second, straight section 7 which is assigned to the second flow path 2. Said individual elements of a respective flow duct are welded to one another in a gas-tight fashion during the course of production. In this way, it is possible to improve operational reliability and production costs since the demands on the flow ducts and their wall materials and thicknesses in the region of the straight sections are different than in the region of the bend pieces 13a.

In the second exemplary embodiment as per FIG. 4.1, the heat exchanger comprises in each case two U-shaped bent extruded profiles 15 composed of aluminum, with an inner extruded profile having a smaller bend radius than an outer extruded profile. Each of the extruded profiles 15 comprises four flow ducts 6 which are separated from one another by inner walls 15a and from the coolant by an outer wall 15b. The base element 14 in which the extruded profiles 15 are held, welded in a gas-tight fashion, with their ends is formed overall as a flange which has a groove 17 for holding a seal and bores 18 for a screw connection to a further connecting region 8.

In a third exemplary embodiment as per FIG. 5.1, in contrast to the second exemplary embodiment, the flow ducts 6 are formed not as extruded profiles but rather as tubes composed of high-grade steel. Said tubes have, in their outer walls, inwardly projecting embossments 6a which may be formed as dimples or winglets, as are known per se. Said formations constitute turbulence-generating means which serve to improve the exchange of heat with the exhaust gas. In the present example, the turbulence-generating means 6a are formed in each case identically in the first flow duct 1 and in the second flow path 2. Said formations may preferably also be different in order to make allowance for the increasing cooling of the fluid over the course of the flow duct.

In the fourth exemplary embodiment as per FIG. 6.1, the flow ducts 6 are likewise composed of high-grade steel flat tubes as are known per se from the prior art. To improve the heat-exchanger power, corrugated inserts 19 are pushed into the flow ducts 6 and welded therein. It is possible here, too, for the inserts to have different formations, in particular different fin densities, at the inlet side and at the outlet side in order to make allowance for the falling temperature of the exhaust gas along the flow ducts.

In the fifth exemplary embodiment as per FIG. 7.1, the flow ducts 6 are formed as tubes with a circular cross section. It is possible for turbulence inserts (not illustrated) or inserts for generating swirl to be provided in said tubes in order to improve the exchanger power.

FIG. 8 shows a modification of the embodiment from FIG. 1.1 with further improved details. Here, the housing 3 is illustrated separately from the base element 14 with its flow ducts 6. A guide element 20 for guiding the coolant is provided on the outside of the flow ducts 6 and within the housing 3. Said guide element 20 runs transversely with respect to the flow ducts 6 and has, in its outer region close to the housing wall 20a, a barrier for the coolant. A more uniform and better-distributed flow of coolant around the flow ducts 6 is obtained in this way. The two connections 4, 5 for the coolant are illustrated as solid circles on the housing part 3. In an alternative embodiment with corresponding adaptation of shape and arrangement of the guide means 20, the connections may also be positioned differently, for example as per the dashed circles. The guide means 20 may also simultaneously serve as a support means for supporting the flow ducts 6 in order to protect the latter from excessive vibration amplitudes.

FIG. 9.1 shows a fully-assembled section illustration of the heat exchanger as per FIG. 1. It can be clearly seen here that a high temperature could only be transmitted to the housing 3 in the region of a screw connection of the housing 3 to the base element 14 and to a connecting region 8, said housing 3 otherwise being in contact only with the liquid coolant. With corresponding design, in particular by means of suitable seals and spacers 21, it is therefore possible for the housing 3 to also be produced from plastic despite the high temperatures of the exhaust gas.

In the sixth preferred exemplary embodiment as per FIG. 10.1 and FIG. 11.1, the heat exchanger comprises a total of forty-eight separate flow ducts 6. Said flow ducts 6 are distributed between eight extruded profiles 15 which are bent in a U-shape and which have in each case six flow ducts 6 which are separate from one another. In each case two extruded profiles 15 run adjacent to one another with the same radius of curvature of the deflecting region, such that a total of four extruded profiles which differ in terms of the different bending radii are present, which extruded profiles are nested one inside the other (see also the plan view FIG. 11.1). Each of the extruded profiles 15 has an outer wall 15*a* which, in cross section, has two parallel long sides and two short sides which are bent in the shape of a semi-circle. Here, the long sides are perpendicular to the plane in which the extruded profile 15 runs. As a result of said shaping, a bend of the extruded profiles even with small bend radii in the deflecting regions 13 is permitted. As the scale drawing of FIG. 10 shows, the outer walls of the extruded profile 15 are considerably thicker than the inner walls 15*b* which separate the six flow ducts from one another. The extruded profiles are composed of an aluminum alloy. The thickness of the outer wall is approximately 1.5 mm. The inner walls or separating webs 15*b* within an extruded profile have a thickness of approximately 0.5 mm. The cross section of an extruded profile is in each case approximately 20 mm long and approximately 7 mm side when the tubes are arranged in two rows in the transverse direction. The tubes may however also be designed to be slightly wider or narrower in both directions, for example 22×6.5 mm or 22×7.5 mm.

In single-row tube systems, the tubes should preferably be selected to be 30-60 mm wide, ideally in the range of 40-50 mm.

One of the connections 4, 5 of the housing 3 is preferably provided at a housing end in the vicinity of the base element 14. The other connection 4, 5 for the coolant is arranged in the vicinity of the deflecting region 13 in a plane of symmetry between the two flow paths 1, 2 in the region of an apex of the deflecting region 13. In this way, it is ensured using simple means that a sufficient flow of the liquid coolant around the flow ducts 6 takes place in the deflecting region 13 too. The cooling circuit of the heat exchanger is in the present case in contact with a main cooling circuit of the internal combustion engine.

The modification as per FIG. 12.1 shows the cross section through an extruded profile which has not yet been bent. Here, as can be seen, one of the long outer walls 16 has a smaller thickness than the other of the long outer walls 17. The thicker outer wall 17 is arranged at the outside in relation to the bend in the deflecting region, and the thinner wall 17 is arranged at the inside. During the course of the bending process, the wall thicknesses are matched to one another on account of the longer outer circumferential length.

The exemplary embodiment as per FIG. 1.1 is of similar design to that in FIG. 7.1. In contrast the embodiment as per FIG. 7.1, not all of the flow ducts run adjacent to one another in parallel, but rather some of the ducts, in their profile, intersect planes in which other ducts run. This is indicated by the dashed lines. A first flow duct 18 of the first flow path 1 is connected in the deflecting region 13 to a first flow duct 19 of the second flow path 2. Said duct runs in a plane which is diagonal with respect to the drawing. A second flow duct 20 of the first flow path 1 is connected to a second flow duct 21 of the second flow path 2. Said duct 20, 21 intersects, with its deflecting region, said plane of the first duct. In order that the continuous duct 18, 19 may extend past the other continuous duct 20, 21, the ducts are designed to be of different length. The one deflecting region is therefore situated in front of the other deflecting region perpendicular to the drawing plane of FIG. 13.1.

In this way, it is possible for given minimum bend radii in the deflecting regions to reduce the spacings of the associated flow ducts in the connecting region. In particular, a spacing which separates the first flow path 1 from the second flow path 2 may be kept small. Furthermore, in the exemplary embodiment as per FIG. 13.1, in contrast to FIG. 7.1, means for generating swirl within the individual flow ducts 18, 19, 20, 21 are indicated.

An alternative or additional possibility for reducing the installation size, and in particular the required minimum spacing of the flow ducts of the two flow paths 1, 2, is shown in the exemplary embodiment as per FIG. 14.1. Here, outer flow ducts 22, 23 are formed as continuous tubes, for example extruded profiles, which are bent in the deflecting region. For the inner flow duct 24, the required bend radius would be too small. Said inner flow duct 24 therefore comprises two separate tubes 24*a*, 24*b* which are assigned to in each case one of the flow paths 1, 2 and which open out correspondingly adjacently with a small spacing in the connecting region. The ducts 24*a*, 2*b* are bent with a slight S-shape in their profile, such that their outer walls come into contact in the deflecting regions 13, with the duct walls being sealingly welded to one another in the region of contact. To complete the deflecting region, a bent cap 25 as an element for connecting the ducts 24*a*, 24*b* is placed on, and sealingly welded, to the duct ends.

FIG. 1.2 shows an exhaust-gas recirculation system 10 with high-pressure recirculation for an internal combustion engine 1, which internal combustion engine 1 is formed in the present case in the manner of a diesel engine for a motor vehicle (not illustrated in any more detail). The diesel engine has an intake line 2 and an exhaust line 3, with an exhaust-gas turbine 4 being arranged in the exhaust line 3 and a compressor 5, which is driven by the exhaust-gas turbine 4, being arranged in the intake line 2 (a so-called exhaust-gas turbocharger). Arranged between the compressor 5 and the intake tract (not illustrated in any more detail) of the internal combustion engine 1 is a charge-air cooler 6 which can be cooled by means of a liquid coolant (not illustrated in any more detail) or, in another embodiment, also alternatively by means of air. Provided downstream of the exhaust-gas turbine 4 is an exhaust-gas purification arrangement 7 which is embodied as a particle filter and/or oxidation catalytic converter. The region 3A which is situated downstream of the exhaust-gas turbine 4 and which has the symbolically illustrated throttle valve, and the region 2A, which is situated upstream of the compressor 5, of the intake line 2 are referred to as the low-pressure side. Fresh air is sucked in via the region 2A, and exhaust gas is discharged into the fresh air via the region 3A. The section 2B which is situated downstream of the compressor 5, and the region 3B which is situated upstream of the exhaust-gas turbine 4, are referred to as the high-pressure side.

In the present case, in the context of the high-pressure recirculation illustrated in FIG. 1.2, an exhaust-gas recirculation line 8 and an exhaust-gas cooler 9 in the form of a high-pressure exhaust-gas cooler are arranged between the line sections of the regions 3B and 2B. The high-pressure exhaust-gas cooler can be connected by means of two connecting pieces 9A, 9B to a coolant circuit (not illustrated in any more detail) of the internal combustion engine 1.

The mode of operation of the illustrated exhaust-gas recirculation system is as follows:

Fresh air is sucked in via the low-pressure line of the region 2A, is compressed to an increased pressure—the charge pressure—by the compressor 5, is supplied via the intake line 2 to the charge-air cooler 6, is cooled there for the purpose of increasing efficiency, and is supplied to the internal combustion engine 1. The exhaust gases which leave the internal combustion engine drive the exhaust-gas turbine 4 in the high-pressure line of the region 3B, which in turn drives the compressor 5. Downstream of the exhaust gas turbine, the diesel exhaust gases are purified predominantly by means of the exhaust-gas purification arrangement 7 and then pass via the region 3A into the atmosphere. In the high-pressure recirculation concept shown here, a partial flow of the exhaust gases is branched off from the high-pressure line 3 in the region 3B via the exhaust-gas recirculation line 8, is cooled in the exhaust-gas cooler 9, and is supplied to the intake line 2 in the high-pressure section 2B, where the recirculated exhaust gases are mixed with the fresh intake air.

FIG. 2.2 shows a further embodiment of an exhaust-gas recirculation system, again for an internal combustion engine 1, in which, here, the same reference symbols parts are used for parts corresponding to FIG. 1. The exhaust-gas recirculation system 20 illustrated FIG. 2 is an exhaust-gas recirculation system 20 with low-pressure recirculation. Correspondingly, an exhaust-gas recirculation line 8' and an exhaust-gas cooler 9' in the form of a low-pressure exhaust-gas cooler are arranged between the low-pressure line sections of the regions 3A and 2A, which exhaust-gas cooler 9' is connected by means of two connecting pieces 9A' and 9B' to a coolant circuit (not illustrated in any more detail) of the internal combustion engine 1. In the present case, the power or the pressure difference across the compressor 5 is decisive for the exhaust-gas quantity (mass flow) which is recirculated via the exhaust-gas cooler 9', and can therefore be increased considerably in relation to a high-pressure exhaust-gas recirculation system, illustrated in FIG. 1, on the high-pressure side of the regions 3A, 3B, in which only the pressure difference between the engine exhaust-gas side and engine intake side are available for the feed flow.

It is fundamentally possible for flow ducts according to the concept of the invention—and in particular as described in more detail on the basis of FIG. 9A.2 to FIG. 14B.2—to be used both in the charge-air cooler 6 and also in the exhaust-gas cooler 9, 9'. In the present case, corresponding flow ducts are arranged only in the exhaust-gas cooler 9, 9'.

Preferred embodiments of an exhaust-gas cooler 9, 9' of said type are described in more detail with reference to the further FIG. 3.2 and FIG. 4.2, wherein it is fundamentally possible for use to also be made of any further form of heat exchanger not described in detail here. In particular, a two-stage heat exchanger (not illustrated in any more detail) may be used within the context of high-pressure recirculation, in particular a heat exchanger, in the form of an exhaust-gas cooler, which is cooled in the first stage by means of a liquid coolant and in a second stage by means of air.

In the two exhaust-gas recirculation systems 10, 20 of FIG. 1.2 and FIG. 2, there is fundamentally the problem that a power increase could be obtained by means of a considerable increase in the number of webs in a flow duct of a heat exchanger 9, 9', though this would come at the expense of an acceptable pressure loss and would result in an increased risk of blockage.

In particular, in the heat exchanger in the form of the exhaust-gas cooler 9' illustrated in FIG. 2.2, within the context of low-pressure recirculation, an increase in the web density in a flow duct would be extremely critical, since the pressure loss in the exhaust-gas recirculation system 20 illustrated in FIG. 2.2 should be kept comparatively low. In an exhaust-gas cooler 9' for low-pressure exhaust-gas recirculation—and also for charge-air cooling—although there is no contamination problem in comparison to the high-pressure exhaust-gas recirculation, an increased pressure loss here however entails a comparatively significant increase in the fuel consumption of the engine.

In the exhaust-gas cooler 9 illustrated in FIG. 1.2 for high-pressure exhaust-gas recirculation of the exhaust-gas recirculation system 10, the increase in the number of webs is associated with both a critical rise in a pressure loss and also the increased risk of blockage or significant contamination by soot particles.

FIG. 3.2 shows one particularly preferred embodiment of a heat exchanger 30, in the present case of I-flow design, which may be used for example as an exhaust-gas cooler 9, 9' in an exhaust-gas recirculation system 10, of FIG. 1.2, FIG. 2.2. The heat exchanger 30 is designed in the present case as an exhaust-gas heat exchanger for exchanging heat between a first fluid 31, in the form of an exhaust gas, and a second fluid 33, in the form of a liquid coolant. The heat exchanger 30 has a block 35 which is designed for the separate and heat-exchanging guidance of the exhaust gas and of the liquid coolant and which has a fluid connection (not illustrated in any more detail) for the exhaust gas. The block 35 has a housing 37 with a chamber which can be traversed by liquid coolant and which is not illustrated in any more detail here. The liquid coolant 33 is supplied and discharged via coolant connections 39 as indicated by the arrow directions in FIG. 3.2. The block 35 has a number of flow ducts 41 which can be traversed by the exhaust gas 31, with the fluid connection which is not illustrated in any more detail here being flow-connected to the flow ducts 41. The flow ducts 41 are held in the housing 37 and are arranged in a block closure element 43 which is formed in the present case in the manner of a flange provided with a plurality of passage openings for the flow ducts 41. The block closure element 43 serves for the fluid-tight separation of the chamber (not illustrated in any more detail) and of the fluid connection (not illustrated in any more detail). During operation, the liquid coolant 33 flows in the chamber around the flow ducts 41 and thereby cools the exhaust gas flowing in the flow ducts 41.

A further embodiment of a heat exchanger 40, of so-called U-flow design, is illustrated in FIG. 4.2, with identical parts or functionally equivalent parts being provided with the same reference symbols as in FIG. 3.2.

The heat exchanger 40, which is of U-flow design, in the form of an exhaust-gas cooler has a deflecting region 47 which is attached to the housing 37 and which is arranged downstream of a first flow path 45, and a second flow path 49 which is arranged downstream of the deflecting region 47. The flow ducts 41 of the first flow path 45 and in the second flow path 49 are continued in the deflecting region 47 as continuous, separate flow ducts 41', which distinguishes the exhaust-gas heat exchanger 40 of U-flow design illustrated here in FIG. 4 from conventional heat exchangers. In the latter, it is specifically the case that the exhaust gas 31 from all of the flow ducts 41' is conducted in the deflecting region 47 without separation.

The flow ducts 41, 41', which in the present case are formed in the manner of a flat tube with three webs 51, 51' as an extruded profile based on an aluminum material, are described in more detail with reference to the further figures and are in the present case illustrated schematically.

FIG. 5.2 shows the behavior of an exchange of heat or degree of exchange and therefore the exemplary behavior of a heat-exchanging power of a heat exchanger on the basis of a calculation, carried out using measurement data, for an example of a heat exchanger 30, 40 designed as an exhaust-gas cooler as shown by way of example in FIG. 3.2 and FIG. 4.2. The data are specified for typical inlet conditions, with an exhaust-gas pressure in the region of 1 bar having been selected for simplicity. The results are however also exemplary for other exhaust-gas pressures. A curve A shows the behavior of a heat exchanger in the non-contaminated state; a curve B shows the behavior of a heat exchanger in the contaminated state. FIG. 5.2 illustrates the degree of exchange as a function of the hydraulic diameter. FIG. 6.2 illustrates the behavior of a pressure loss as a function of the hydraulic diameter.

As can be seen on the basis of curve A in FIG. 5.2, the degree of exchange/heat exchange, which is representative of the heat exchanger power, increases further with decreasing hydraulic diameter in the case that the heat exchanger is not contaminated. Below a hydraulic diameter of 6 mm, the degree of exchange is in an acceptable range. As can be seen from curve B in FIG. 5.2, the degree of exchange decreases again below a certain hydraulic diameter in the case that the heat exchanger is not contaminated. Such a lower limit of a hydraulic diameter is 1.5 mm. The concept of the invention therefore provides that a flow duct is characterized by a hydraulic diameter, defined as four times the ratio of the area of the cross section which can be traversed by flow to a periphery wetted by the first fluid, which is in a range between 1.5 mm and 6 mm. The same is predefined by the pressure loss illustrated in more detail in FIG. 6.2, which passes into an acceptable range below a hydraulic diameter of 6 mm but is no longer acceptable below a hydraulic diameter of 1.5 mm. Furthermore, it can be seen from the differently-hatched regions of FIG. 5.2 and FIG. 6.2 that a hydraulic diameter should preferably lie in a range between 2 mm and 5 mm. As shown by the darker hatched region, the upper level, which runs comparatively flat, of a degree of exchange in the case of a contaminated heat exchanger lies in the preferred range of a hydraulic diameter between 2.5 and 3.5 mm or 2.8 mm and 3.8 mm, with the latter range being relevant primarily for a high-pressure heat exchanger. It has specifically been found that the degree of contamination is less relevant in a low-temperature heat exchanger on account of the exhaust-gas purification arrangement 7 (illustrated in FIG. 2), which is connected upstream of the heat exchanger in the form of the exhaust-gas cooler 9', than in a high-pressure heat exchanger (illustrated in more detail in FIG. 1) in the form of the exhaust-gas cooler 9, which is conventionally subjected to higher particle and contamination loadings than a low-temperature heat exchanger. A pressure loss as illustrated in FIG. 6.2 is nevertheless relevant both for a low-temperature heat exchanger and also for a high-temperature heat exchanger.

It can be seen from the upper curve in FIG. 7.2 that a pressure loss—illustrated in the present case on the basis of a pressure loss for a flow duct with a limit-value hydraulic diameter of 1.5 mm—rises further with increasing contamination, specified as operating time in hours. In contrast, it has been found that, by selecting a hydraulic diameter of 3.2 mm—and likewise by selecting a hydraulic diameter in the range between 3.0 mm and 3.4 mm, preferably between 3.1 mm and 3.3 mm—the degree of contamination evidently stabilizes even with progressing operating time, such that a pressure loss stabilizes at an acceptable level.

FIG. 8.2 illustrates the ratio of the periphery wetted by an exhaust gas and an outer periphery of the flow duct as a function of the hydraulic diameter. A preferred ratio can be gathered from the above-explained hatched regions of a preferred hydraulic diameter of 2 mm to 5 mm, in particular 2.8 mm to 3.8 mm. It can be seen from FIG. 8 that said ratio should lie in the range between 0.1 and 0.5 in order to obtain the improved degrees of exchange and degrees of pressure loss explained in more detail on the basis of FIG. 5 and FIG. 6. FIG. 8 is in the present case specified by way of example for a profile of a flow duct shown in more detail in FIG. 10B. A comparable tendency can also be observed in the further structural designs (described in more detail below) of a cross section which can be traversed by flow in a flow duct. For example, FIG. 8.2 shows the explained ratio for different web spacings a, inter alia of FIG. 10B.2 (in the present case for two examples a=2 mm and 9=5 mm) and for different values of a ratio, denoted here by k, of a spacing between two opposite partial webs to a height of a tube cross section. The ratio k should, as illustrated in FIG. 8 by arrows, lie in a range below 0.8 mm, preferably in a range between 0.3 mm and 0.7 mm. Here, the ratio k of a spacing 2 between two opposite partial webs to a height b of the tube cross section increases from 0.25 to 0.75 in the direction of the arrow. This analysis applies both to an exhaust-gas cooler 9 (illustrated by way of example in FIG. 1.2) for a high-pressure design in an exhaust-gas recirculation system 10, and also for an exhaust-gas cooler 9' (illustrated by way of example in FIG. 2.2) for a low-pressure design in an exhaust-gas recirculation system 20.

Below, exemplary structural designs of a cross section of different preferred flow ducts are described (FIG. 9A.2 to FIG. 14B.2). Here, it should nevertheless be clear that modifications of said flow duct and any desired combination of features of the physical embodiments described in the figures are possible, and it is nevertheless possible to obtain a hydraulic diameter in the range between 1.5 mm and 6 mm, preferably between 2 mm and 5 mm, preferably between 2.8 mm and 3.8 mm. In particular, the embodiments shown in the following figures each show a modification in which a duct casing thickness and a web thickness d are identical or similar and a duct casing thickness s is less than 1.0 mm. Correspondingly, the wall thicknesses of partial webs or similar dimensions can also be varied and adapted according to the aim to be achieved.

In particular, the following true-to-scale figures show embodiments of flow ducts as can be used in an exhaust-gas recirculation system illustrated by way of example in FIG. 1.2 and FIG. 2.2 or in a heat exchanger illustrated by way of example in FIG. 3 and FIG. 4, for example instead of the flow ducts 41 in the heat exchanger 30 or instead of the flow ducts 41' in the heat exchanger 40. In particular, the flow ducts explained below meet all of the requirements, explained with reference to FIG. 5 to FIG. 8, of a hydraulic diameter according to the concept of the invention.

FIG. 9A.2 and FIG. 9B.2 show two modifications of a flow duct 61, 61', with the modifications differing in that the casing thickness s in the flow duct 61' illustrated in FIG. 9B is thicker than a web thickness d, while said casing thickness s and web thickness d are substantially identical in the flow duct 61 illustrated in FIG. 9A. Furthermore, the same reference symbols are used for identical features.

The flow duct 61, 61' is, overall, an extruded profile, that is to say is formed as an extruded duct casing together with the extruded webs. The flow duct 61, 61' correspondingly has a duct casing 63 having an inner space 67 which is surrounded by a duct casing inner side 65 and which is in the present case designed for heat-exchanging guidance of the first fluid in the form of an exhaust gas. Furthermore, the flow duct 61, 61' has, in the present case, a number of five webs 69 which are arranged in the inner space 67 on the duct casing inner side 65, which webs 69 are formed together with the duct casing 63, 63' as an integral extruded profile. A web 69 runs entirely parallel to a flow duct axis, which is perpendicular to the plane of the drawing, continuously along the flow path formed in the housing 37 of a heat exchanger 30, 40 of FIG. 3.2, FIG. 4.2. The illustrated cross section, which can be traversed by flow, transversely with respect to the flow duct axis is design for conducting the exhaust gas in the interior space 67. The design is carried out on the basis of the hydraulic diameter $d_h$, which is specified for the present flow duct profile 61, 61' with reference to the spacings a, b at the bottom right in FIG. 9B. The hydraulic diameter is defined as four times the ratio of the area of the cross section which can be traversed by flow to a periphery wetted by the first fluid. The area of the cross section which can be traversed by flow is in the present case a multiple of the product of a and b. The wetted periphery is in the present case likewise a multiple of twice the sum of a and b. Here, a denotes the width of the free cross section of a flow line 74 which is divided in the flow duct by the webs 69, and b denotes the free height of the flow line 74.

In said flow duct 63, 63', and also in the flow ducts explained in more detail below, a wall thickness s is in the range between 0.2 mm and 2 mm, preferably in the range between 0.8 mm and 1.4 mm. A height b of a flow path 74 or a height of the inner space 67 is in the present case in the range between 2.5 mm and 10 mm, preferably in the range between 4.5 mm and 7.5 mm. A width a of a flow path 74 is in the range between 3 mm and 10 mm, preferably in the range between 4 mm and 6 mm.

FIG. 10A.2 and FIG. 10B.2 show two further modifications of a particularly preferred embodiment of a flow duct 71, 71', which—as explained above—differ merely in the wall thickness of the duct casing 73, 73' relative to the wall thickness of a web 79. The flow duct 71, 71' also has the webs 79 in the form of full webs and partial webs 79' which are arranged alternately adjacent to the full webs 79. The flow duct 71, 71' is in turn formed entirely as an extruded profile, with a flow path 74 in turn being formed by the spacing between two full webs 79. The hydraulic diameter of the cross section, which can be traversed by flow, in the flow ducts 71, 71' shown in FIG. 10A and FIG. 10B is specified beneath FIG. 10B. In the present case, in each case two partial webs 79' are arranged with opposing end sides 76.

FIG. 11A.2 and FIG. 11B.2 show two further modifications 81, 81' of a particularly preferred embodiment of a flow duct 81, 81' in which two partial webs 89' are arranged with end sides laterally offset with respect to one another. A hydraulic diameter $d_h$ for the profile shown is again defined by the formula shown beneath FIG. 10B, wherein $a_1$ must be replaced by $a_4$.

A ratio of a spacing $a_3$ of a first partial web 89' to a full web 89 to a spacing $a_4$ of a second partial web 89' to the full web is in a range between 0.5 mm and 0.9 mm, preferably in a range between 0.6 mm and 0.8 mm. The spacing e between two opposite partial webs 79' and/or between two partial webs 89' which are offset with respect to one another to a height b of the tube cross section is fundamentally in a range below 0.8 mm, in particular in a range between 0.3 mm and 0.7 mm.

While the flow ducts shown above are formed with an extruded duct casing and webs which are integrally extruded with said duct casing, the flow ducts shown in FIG. 12A.2 to FIG. 14B.2 are produced as an extruded duct casing 93, 93' with a number of webs 99 which are produced separately from the duct casing 93, 93' and are connected to the duct inner side. For this purpose, a profile 92, 92' (illustrated in FIG. 12B.2 to FIG. 14B.2) with a corrugated cross section is formed and inserted—in the present case pushed—into the duct casing 93, 93'. The profile 92, 92' is then cohesively connected to the duct inner side 65. The cohesive connection takes place in the present case by soldering the profile 92, 92' to the duct inner side 65.

In this regard, FIG. 12A.2 shows a cross section, and FIG. 12B.2 shows a plan view detail, of a flow duct 91 with a rectuangularly corrugated profile 92 or trapezoidally corrugated profile 92', shown in each case pushed into a duct casing 93 as shown in FIG. 12A.2 and into a duct casing 93' as shown in FIG. 13A.2.

As can be seen in each case in the plan view of FIG. 12B.2 and FIG. 13B.2, a number of profiles 92, 92' of said type which are corrugated in cross section are arranged in each case in a length t, and in series, along a flow duct axis 94. Here, the corrugated profiles 92, 92' are offset with respect to one another by a small spacing, such that an exhaust gas which flows in the flow duct along the flow duct axis 94 impinges in each case alternately on the front edges of corrugated profiles 92, 92' which are arranged in series.

A width of offset f of the profiles 92, 92' which are arranged in series is in the range between 0.1 mm and 0.8 mm, preferably in the range between 0.3 mm and 0.6 mm.

A moderate turbulence generated in this way increases the exchange of heat in a flow duct 91, 91' without unacceptably increasing the pressure loss. A value for a hydraulic diameter $d_h$ for the two flow ducts 91, 91' of FIG. 12A.2, FIG. 12B.2 and FIG. 13A.2, FIG. 13B.2 is specified beneath FIG. 12A.2.

FIG. 14A.2 and FIG. 14B.2 each show a modification of a flow duct 91 with a rectangularly corrugated profile 92 and of a flow duct 91' with a trapezoidally corrugated profile 92', with the profiles 92, 92' being provided, in a modified form, additionally with an integrally soldered gill rib 98. This again generates a moderate turbulence in the interior space 67, which advantageously increases an exchange of heat in the flow duct 91, 91' according to the modification in FIG. 14A.2 and FIG. 14B.2.

In summary, the invention relates to a flow duct 41, 41', 61, 61', 71, 71', 81, 81', 91, 91' for a heat exchanger 30, 40 for an exchange of heat between a first fluid 31 and a second fluid 33, having: an extruded duct casing 63, 63', 73, 73', 83, 83', 93, 93' having an interior space 67 which is surrounded by a duct casing inner side 65; a number of webs 69, 79, 79', 89, 89', 99 arranged in the interior space 67 on the duct casing inner side 65, which flow duct has a cross section, which is designed for conducting the first fluid 31 in the interior space and which can be traversed by flow, transversely with respect to a flow duct axis 94. In order to ensure an improved exchange with a simultaneously still-acceptable pressure loss and reduced risk of blockage, a hydraulic diameter $d_h$, defined as four times the ratio of the area of the cross section which can be traversed by flow to a periphery wetted by the first fluid, is provided in a range between 1.5 mm and 6 mm. The invention encompasses a heat exchanger which has a block with a number of flow ducts of said type, which flow ducts can be traversed by the first fluid and are flow-connected to a flow connection. The invention also encompasses a charge-air system, an exhaust-gas recirculation system and a use of the heat exchanger.

The invention relates, according to a first variant, to a heat exchanger for a motor vehicle, comprising a first flow path (1) having a plurality of flow ducts (6) for conducting a fluid which is to be cooled, a deflecting region (13) connected downstream of the first flow path (1), and a second flow path (2) connected downstream of the deflecting region (13), with the flow ducts (6) of the first flow path (1) being continued in the deflecting region (13) and in the second flow path (2) as continuous flow ducts (6) which are separate from one another.

The invention relates, according to a second variant, to a flow duct (41, 41', 61, 61', 71, 71', 81, 81', 91, 91') for a heat exchanger (30, 40) for an exchange of heat between a first fluid (31) and a second fluid (33), having: a duct casing (63, 63', 73, 73', 83, 83', 93, 93') having an interior space (67) which is surrounded by a duct casing inner side (65); a number of webs (69, 79, 79', 89, 89', 99) arranged in the interior space (67) on the duct casing inner side (65), which flow duct has a cross section, which is designed for conducting the first fluid (31) in the interior space and which can be traversed by flow, transversely with respect to a flow duct axis (94). In order to ensure an improved exchange with a simultaneously still-acceptable pressure loss and reduced risk of blockage, a hydraulic diameter, defined as four times the ratio of the area of the cross section which can be traversed by flow to a periphery wetted by the first fluid, is provided in a range between 1.5 mm and 6 mm. The invention encompasses a heat exchanger (30, 40) which has a block with a number of flow ducts (41, 41', 61, 61', 71, 71', 81, 81', 91, 91') of said type, which flow ducts can be traversed by the first fluid (31) and are flow-connected to a flow connection. The invention also encompasses a charge-air system, an exhaust-gas recirculation system and a use of the heat exchanger.

The individual detail features of the different detailed exemplary embodiments, in particular also of the first and second variants of the invention, may be freely combined with one another in any meaningful way.

The invention claimed is:

1. A flow duct for a heat exchanger, for an exchange of heat between a first fluid, which includes an exhaust gas or exhaust-gas/air mixture or charge air, and a second fluid, which includes a coolant, comprising:
 a duct casing having an interior space which is surrounded by a duct casing inner side;
 webs arranged in the interior space on the duct casing inner side,
 wherein the flow duct has a cross section, which is designed for conducting the first fluid in the interior space and which is configured to be traversed by flow, transversely, with respect to a flow duct axis, and
 wherein a hydraulic diameter of at most the flow duct, defined as four times a ratio of an area of a cross section which is configured to be traversed by flow to a periphery wetted by the first fluid, is in a range between 1.5 mm and 6 mm, and
 wherein a ratio of the hydraulic diameter and a duct casing thickness is in a range between 0.8 and 8.

2. A flow duct according to claim 1, wherein the hydraulic diameter is in a range between 2 mm and 5 mm.

3. A flow duct according to claim 1, wherein the hydraulic diameter is in a range between 3.0 mm and 3.4 mm.

4. A flow duct according to claim 1, wherein the hydraulic diameter is in a range between 2.5 mm and 3.5 mm.

5. A flow duct according to claim 1, wherein a ratio of a web thickness and a duct casing thickness is less than 1.0.

6. A flow duct according to claim 1, wherein a ratio of the periphery wetted by the first fluid and an outer periphery of the flow duct is in a range between 0.1 and 0.5.

7. A flow duct according to claim 1, wherein a ratio of a spacing between two partial webs, which are opposite one another and/or offset with respect to one another, to a height of the flow duct cross section is in a range below 0.8.

8. A flow duct according to claim 1, wherein a ratio of a spacing of a first partial web to a full web to a spacing of a second partial web to the full web is in a range between 0.5 and 0.9.

9. A flow duct according to claim 1, wherein at least the duct casing comprises an aluminum-based material.

10. A flow duct according to claim 1, wherein at least the duct casing comprises a steel-based material.

11. A flow duct according to claim 1, wherein the duct casing is formed as a welded tube, a soldered tube, or as an extruded tube.

12. A flow duct according to claim 1, wherein at least the duct casing is formed as an extruded profile.

13. A flow duct according to claim 1, wherein the duct casing is formed by metal sheets.

14. A flow duct according to claim 1, wherein at least one web is a web which is extruded with the duct casing.

15. A flow duct according to claim 1, wherein at least one web is further integrally formed and/or molded and/or shaped.

16. A flow duct according to claim 1, wherein at least one web runs parallel to the flow duct axis.

17. A flow duct according to claim 1, wherein at least one web is continuous along the flow duct axis.

18. A flow duct according to claim 1, wherein at least one web is a web which is produced separately from the duct casing and which is connected to the duct casing inner side.

19. A flow duct according to claim 1, wherein a web is inserted into the duct casing.

20. A flow duct according to claim 1, wherein a web is soldered, welded and/or adhesively bonded to the duct casing inner side.

21. A flow duct according to claim 1, wherein a web is milled, punched and/or rolled.

22. A flow duct according to claim 1, wherein at least one web and/or the duct casing has a corrosion prevention arrangement.

23. A flow duct according to claim 1, wherein the duct casing is formed in a manner of a flat tube.

24. A flow duct according to claim 1, wherein the flow duct is of rectangular, oval or semi-oval design.

25. A flow duct according to claim 1, wherein a web as a full web in the flow duct cross section is arranged at one end and at the other end on the duct casing inner side.

26. A flow duct according to claim 1, wherein a web as a partial web in the flow duct cross section is arranged only at one end on the duct casing inner side and at another end projects freely into the interior space.

27. A flow duct according to claim 26, wherein two partial webs are arranged with opposing end sides at the another end.

28. A flow duct according to claim 26, wherein two partial webs are arranged with end sides which are laterally offset with respect to one another at the another end.

29. A flow duct according to claim 1, wherein a partial web and a full web are arranged alternately adjacent to one another.

30. A flow duct according to claim 1, wherein a web is formed as part of a profile with a corrugated cross section.

31. A flow duct according to claim 30, wherein profiles which are corrugated in cross section are arranged in series along the flow duct axis.

32. A flow duct according to claim 30, further comprising a web having flow conducting elements and/or turbulence elements.

33. A flow duct according to claim 30, further comprising flow conducting elements and/or turbulence elements selected from the group consisting of:
 interruptions and/or openings along the flow duct axis, wherein the interruptions and/or openings include punched-out portions, convexities, and gills;
 corrugations;
 web openings which are offset relative to one another.

34. A flow duct according to claim 32, wherein 2 to 20 webs are arranged adjacent to one another over the flow duct cross section.

35. A heat exchanger for a motor vehicle, comprising:
 a first flow path having flow ducts for conducting a first fluid which is to be cooled,
 a deflecting region connected downstream of the first flow path,
 a second flow path connected downstream of the deflecting region,
 wherein the flow ducts of the first flow path are continued in the deflecting region and in the second flow path as continuous flow ducts which are separate from one another, for an exchange of heat between the first fluid and a second fluid, a block for separate and heat-exchanging guidance of the first and second fluids, a fluid connection for the first fluid;

a housing with a chamber which is configured to be traversed by the second fluid, and a block closure element configured to separate the chamber and the fluid connection;

wherein the block has flow ducts according to claim 1, wherein the flow ducts are configured to be traversed by the first fluid, and the fluid connection is flow-connected to the flow ducts.

36. A heat exchanger according to claim 35, wherein the block closure element is provided with one passage opening or with passage openings for the flow ducts.

37. A heat exchanger according to claim 35, further comprising, with regard to the first fluid, inlet-side and outlet-side block closure element (I-flow) and/or block closure element.

38. A heat exchanger according to claim 35, wherein the fluid connection is a diffuser.

39. An exhaust-gas recirculation system for an internal combustion engine, comprising:
- an exhaust-gas recirculation line,
- a compressor and
- a heat exchanger according to claim 35, which is an exhaust-gas heat exchanger.

40. A charge-air supply system for an internal combustion engine, comprising:
- a charge-air intake line,
- an air filter,
- a compressor, and
- a heat exchanger according to claim 35, which is a charge-air heat exchanger.

41. A heat exchanger according to claim 35, wherein the motor vehicle includes a diesel engine.

42. A heat exchanger according to claim 35, wherein the motor vehicle includes a spark-ignition engine.

* * * * *